(12) United States Patent
Adaniya et al.

(10) Patent No.: US 7,521,833 B2
(45) Date of Patent: Apr. 21, 2009

(54) PERMANENT MAGNET EMBEDMENT ROTATING ELECTRIC MACHINE, MOTOR FOR CAR AIR CONDITIONER, AND ENCLOSED ELECTRIC COMPRESSOR

(75) Inventors: Taku Adaniya, Kariya (JP); Ai Saeki, Kariya (JP); Kiyoshi Uetsuji, Kariya (JP); Hiroshi Fukasaku, Kariya (JP); Minoru Mera, Kariya (JP); Masatoshi Kobayashi, Kariya (JP)

(73) Assignee: Kabushiki Kaisha Toyota Jidoshokki, Kariya-Shi (JP)

( * ) Notice: Subject to any disclaimer, the term of this patent is extended or adjusted under 35 U.S.C. 154(b) by 464 days.

(21) Appl. No.: 11/403,692

(22) Filed: Apr. 13, 2006

(65) Prior Publication Data

US 2006/0250041 A1    Nov. 9, 2006

(30) Foreign Application Priority Data

| Apr. 14, 2005 | (JP) | 2005-117463 |
| Feb. 13, 2006 | (JP) | 2006-035777 |
| Feb. 28, 2006 | (JP) | 2006-054093 |

(51) Int. Cl.
  *H02K 21/12* (2006.01)
(52) U.S. Cl. .............................. 310/156.53
(58) Field of Classification Search ............ 310/156.53, 310/156.56, 156.45, 156.46; *H02K 1/27, H02K 21/14*
See application file for complete search history.

(56) References Cited

U.S. PATENT DOCUMENTS 5,864,191 A    1/1999    Nagate et al. ............... 310/156

| 6,759,776 B2 | 7/2004 | Takahata et al. | 310/156.38 |
| 6,759,777 B2 | 7/2004 | Takahata et al. | 310/156.38 |
| 2003/0218399 A1 | 11/2003 | Iles-Klumpner | 310/156.53 |

FOREIGN PATENT DOCUMENTS

| DE | 19851883 | 5/2000 |
| DE | 10020946 | 11/2001 |
| JP | 5-191936 | 7/1993 |
| JP | 7-222384 | 8/1995 |
| JP | 2000-197292 | 7/2000 |
| JP | 2001-69701 | 3/2001 |
| JP | 2002-95194 | 3/2002 |
| JP | 2002-136011 | 5/2002 |
| JP | 2004-260972 | 9/2004 |
| JP | 2005-86955 | 3/2005 |
| WO | WO 03/081748 | 10/2003 |

*Primary Examiner*—Javaid Nasri
(74) *Attorney, Agent, or Firm*—Knoble Yoshida & Dunleavy, LLC

(57) ABSTRACT

A rotating electric machine including circumferential portions respectively corresponding to magnetic pole centers of permanent magnets and defined along the outer circumference of the rotor at a plurality of locations, with each circumferential portion extending along part of a virtual circumferential surface, which is coaxial with the rotor. The circumferential portions are spaced from one another in the circumferential direction. Convex portions connect adjacent pairs of the circumferential portions. Each convex portion is located radially inward from the circumferential surface, projects in a radially outward direction, and includes angled portions directed in the radially outward direction. The rotating electric machine suppresses decrease in the average value of the output torque and does not use reluctance torque to increase the average value of the output torque.

23 Claims, 25 Drawing Sheets

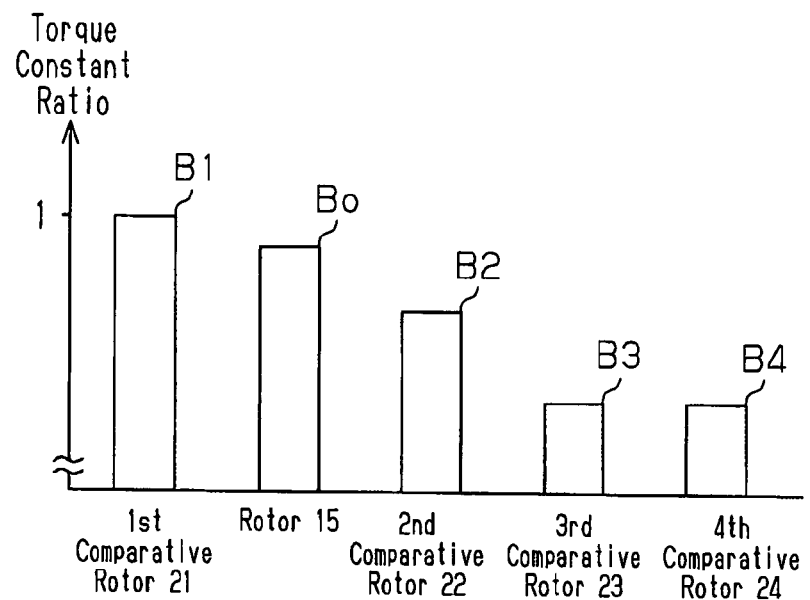
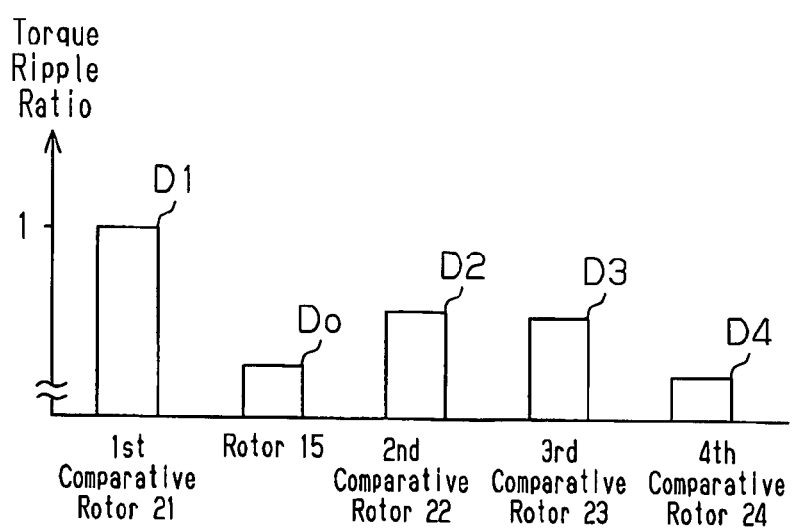

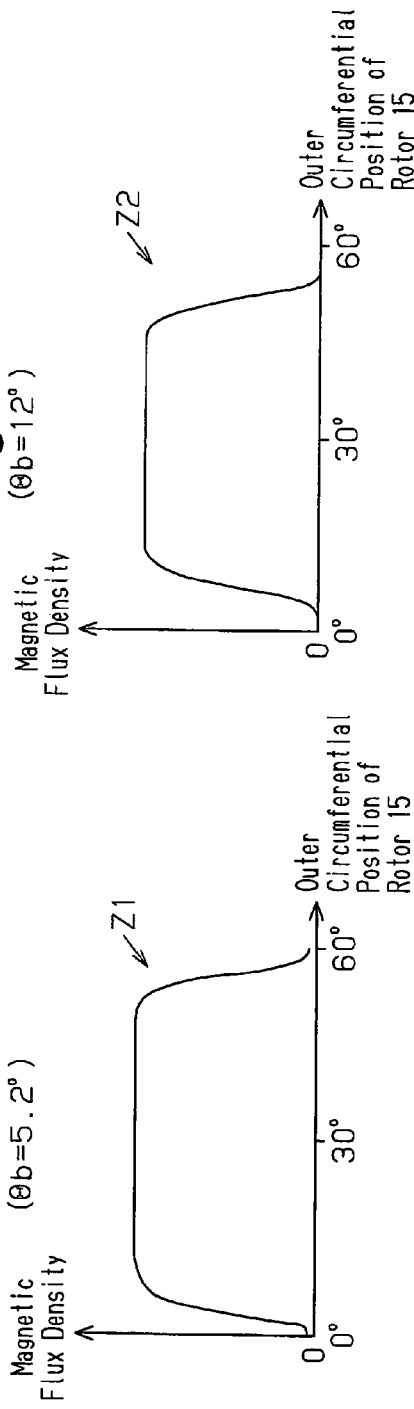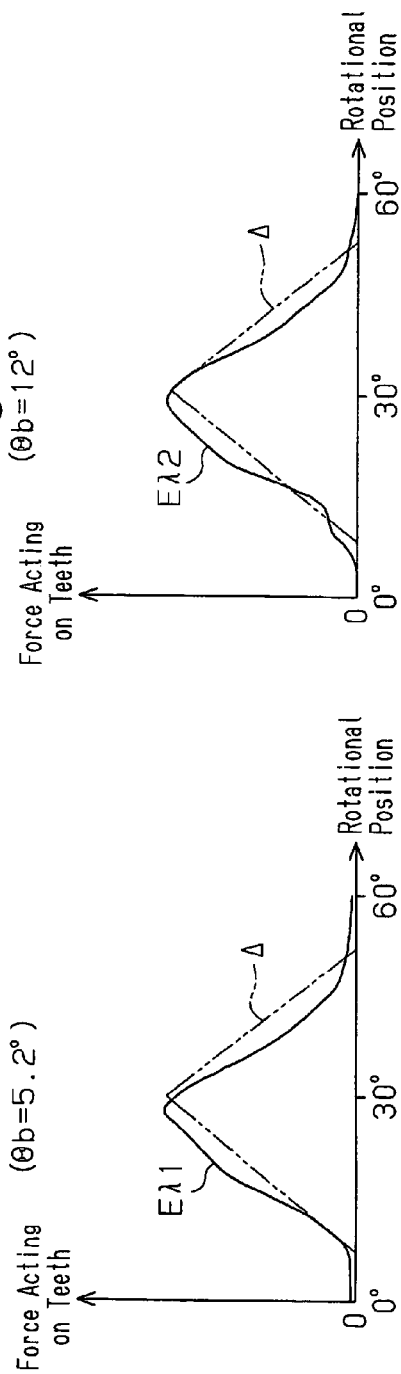

(1st Comparative Rotor 21)

(Rotor 15)

(5th Comparative Rotor 25)

(Rotor 15)

(5th Comparative Rotor 25)

(Qr₁₂)
(Rotor 15)

(Qr₂₂)
(5th Comparative Rotor 25)

(Dh=0.1mm)

(Dh=0.3mm)

(Dh=0.5mm)

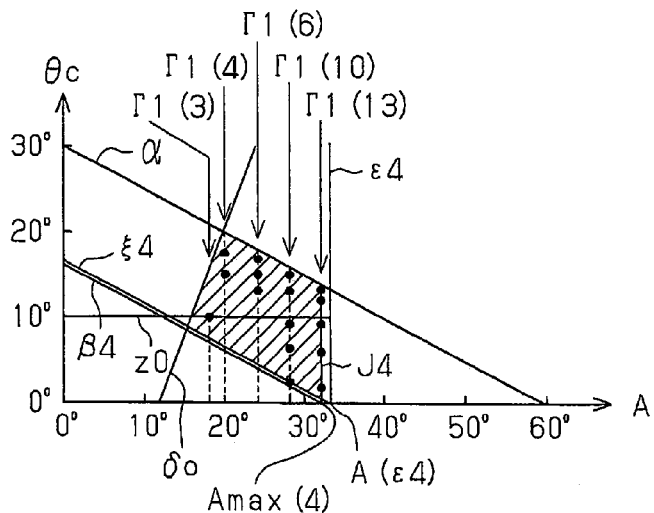
Fig.23A (Dh=0.7mm)
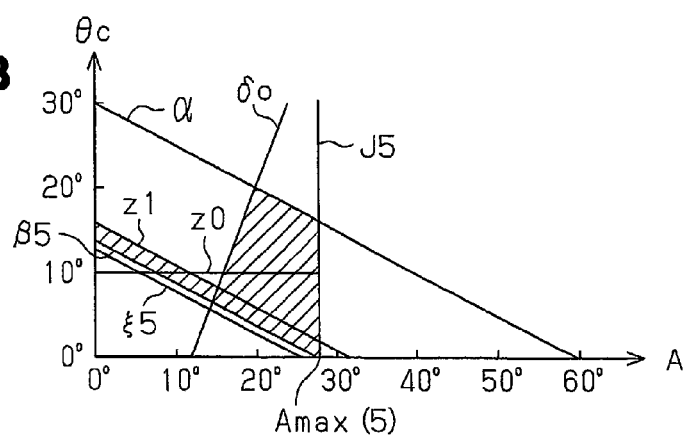
Fig.23B (Dh=1.0mm)
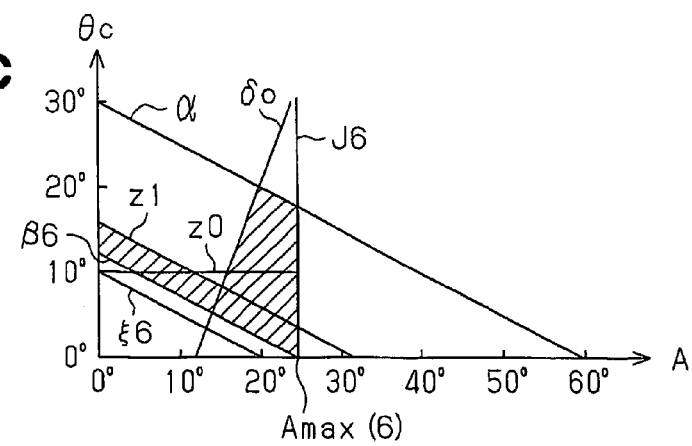
Fig.23C (Dh=1.2mm)

PERMANENT MAGNET EMBEDMENT ROTATING ELECTRIC MACHINE, MOTOR FOR CAR AIR CONDITIONER, AND ENCLOSED ELECTRIC COMPRESSOR

BACKGROUND OF THE INVENTION

The present invention relates to a permanent magnet embedment rotating electric machine in which a plurality of permanent magnets are embedded as magnetic poles inside a rotor that rotates in a stator around which windings are wound. The present invention also relates to a motor for a car air conditioner incorporating such a rotating electric machine and to an enclosed electric compressor.

A plurality of permanent magnets are embedded inside the rotor of this type of rotating electric machine so as to be adjacent to each other in the circumferential direction of the rotor. Two permanent magnets adjacent to each other in the circumferential direction of the rotor are set so that the magnetic poles are differently arranged. Since sudden magnetic flux density fluctuation occurs at a location (magnetic pole switching part) between the two adjacent permanent magnets, torque pulsation occurs and causes vibration and noise in the rotating electric machine.

Japanese Laid-Open Patent Publication No. 2001-69701 describes a motor having a rotor of which the radius becomes minimal at a location (magnetic pole switching part) between two permanent magnets that are adjacent to each other in the circumferential direction to suppress the torque pulsation. Further, the rotor has an outer circumference with a sinusoidal wave shape so that the radius of the rotor becomes maximal at the central portion (magnetic pole center) of each permanent magnet.

Japanese Laid-Open Patent Publication No. 2002-95194 describes a motor having a rotor of which the radius becomes minimal at a location between two adjacent permanent magnets (magnetic pole switching portion) in the circumferential direction and becomes maximal at the magnetic pole center. This is achieved by projecting the portion corresponding to the magnetic center on the outer circumference of the rotor outward into the shape of an arc.

Japanese Laid-Open Patent Publication No. 2002-136011 describes a motor having a portion corresponding to a magnetic pole center along the outer circumference of a rotor shaped as a Circumferential portion, which is coaxial with the rotor. Further, in the outer circumference of the rotor, the portion corresponding to two adjacent permanent magnets is groove-shaped.

In the motor disclosed in Japanese Laid-Open Patent Publication No. 2002-136011, the shape of the portion corresponding to the magnetic pole center of the outer circumference of the rotor is the circumferential portion that is concentric with the rotational axis of the rotor. Further, the part of the outer circumference of the rotor corresponding to the adjacent magnetic pole ends of the two permanent magnets has a groove shape.

Japanese Laid-Open Patent Publication No. 2004-260972 describes a motor in which a main magnetic pole portion and an auxiliary magnetic pole portion are alternately arranged in the circumferential direction. The outer circumference of the rotor is defined by alternately connecting a first curve portion, which corresponds to the main magnetic pole portion, and a second curve portion, which corresponds to the auxiliary magnetic pole portion. The curvature of the second curve portion is greater than the curvature of the first curve portion. An example using arcs for the first curve portion and for the second curve portion is described.

However, in the motors of Japanese Laid-Open Patent Publication No. 2001-69701 and Japanese Laid-Open Patent Publication No. 2002-95194, the location where the gap between the teeth of the stator and the outer circumference of the rotor becomes minimal is only the point-like portion corresponding to the magnetic pole center of the outer circumference in the side cross-section of the rotor. A torque constant (output torque per unit current) of the motor in the two publications thus becomes small compared to when the outer circumference radius of the rotor is constant.

In the motor of Japanese Laid-Open Patent Publication No. 2002-136011, the gap between the teeth of the stator and the outer circumference of the rotor greatly changes between the circumferential portion and the groove-shaped portion. Thus, the prevention of torque pulsation becomes difficult. When the groove is deep, the torque constant of the motor in Japanese Laid-Open Patent Publication No. 2002-136011 becomes further smaller than the torque constant of the motor in Japanese Laid-Open Patent Publication No. 2001-69701 and Japanese Laid-Open Patent Publication No. 2002-95194.

In the motor of Japanese Laid-Open Patent Publication No. 2004-260972, the steel portion between the main magnetic poles of the rotor is enlarged, as shown in FIG. 1 of the publication. That is, reluctance torque can easily be used. Therefore, a technique for reducing noise or vibration of the motor while suppressing the lowering of the average value of the output torque is disclosed.

SUMMARY OF THE INVENTION

It is an object of the present invention to provide a permanent magnet embedment rotating electric machine that suppresses the lowering of the average value of the output torque and that does not use reluctance torque to increase the average value of the output torque (i.e., structure in which the steel core portion between the main magnetic poles is narrow). Since the torque pulsation [hereinafter referred to as torque ripple (fluctuation width of the output torque)] increases when the space between the magnetic poles is widened, this is prevented. Further, the torque waveform is increased to a higher order to reduce the torque ripple and noise or vibration. The present invention also relates to a motor for car air conditioner and an enclosed electric compressor.

One aspect of the present invention is a rotating electric machine provided with an annular stator including an inner circumference, a plurality of teeth arranged along the inner circumference of the stator, and a slot defined between adjacent ones of the teeth. A coil is arranged in the slot. A rotor is surrounded by the stator, with the rotor having a rotational axis and an outer circumference extending about the rotational axis in a circumferential direction. A plurality of permanent magnets are embedded in the rotor, with each permanent magnet having a magnetic pole center. A plurality of circumferential portions respectively correspond to the magnetic pole centers and are defined along the outer circumference of the rotor at a plurality of locations, with each circumferential portion extending along part of a virtual circumferential surface, which is coaxial with the rotor, and spaced from one another in the circumferential direction. A plurality of convex portions connect adjacent pairs of the circumferential portions. Each of the convex portions is located radially inward from the virtual circumferential surface, projects in a radially outward direction, and includes a plurality of angled portions directed in the radially outward direction.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 7A is a graph showing a FEM (Finite Element Method) analysis example of the torque constant of the rotor 15 and the first to the fourth comparative rotors 21 to 24;

FIG. 7B is a graph showing the FEM analysis example of the torque ripple of the rotor 15 and the first to the fourth comparative rotors 21 to 24;

FIGS. 9A and 9B are graphs showing an auxiliary magnetic pole of the rotor 15;

FIG. 9C is a graph showing the force acting on the teeth for the case of FIG. 9A;

FIG. 9D is a graph showing the force acting on the teeth for the case of FIG. 9B;

FIG. 23A to FIG. 23C are graphs showing the determination of an appropriate range for the angular width A and the angular width θc having a torque ripple rate ratio Rx/Ri of less than or equal to 1;

FIG. 30A is a partial cross-sectional view of a motor according to a second embodiment of the present invention;

FIG. 30B and FIG. 30C are partially enlarged views of FIG. 30A; and

DETAILED DESCRIPTION OF THE PREFERRED EMBODIMENTS

A first embodiment of the present invention will now be described with reference to FIGS. 1 to 29.

Figure 1:
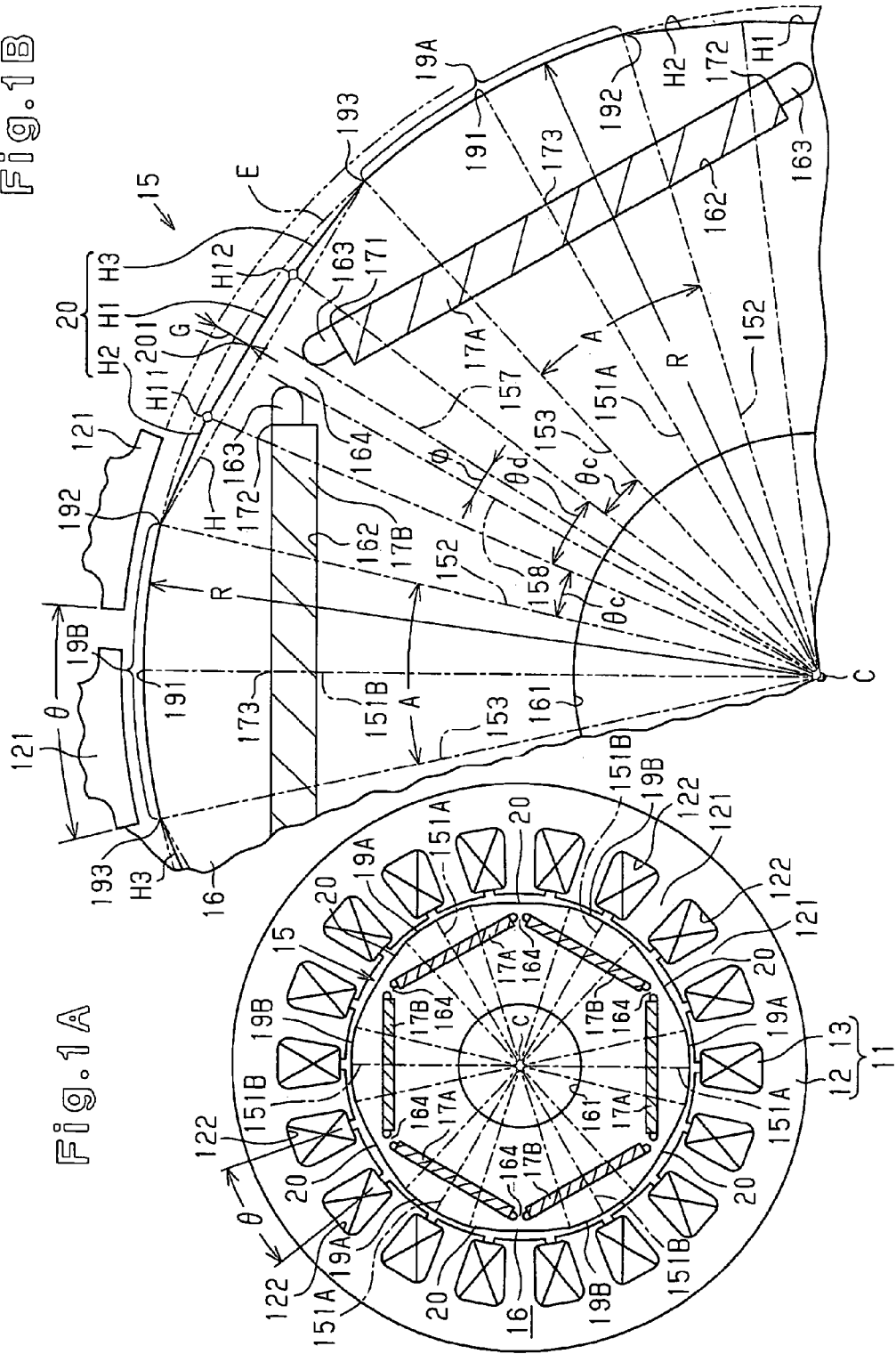
FIG. 1A is a front cross-sectional view of a stator and a rotor of a motor according to a first embodiment embodying the present invention.
FIG. 1B is a partially enlarged front cross-sectional view of FIG. 1A.
Figure 2:
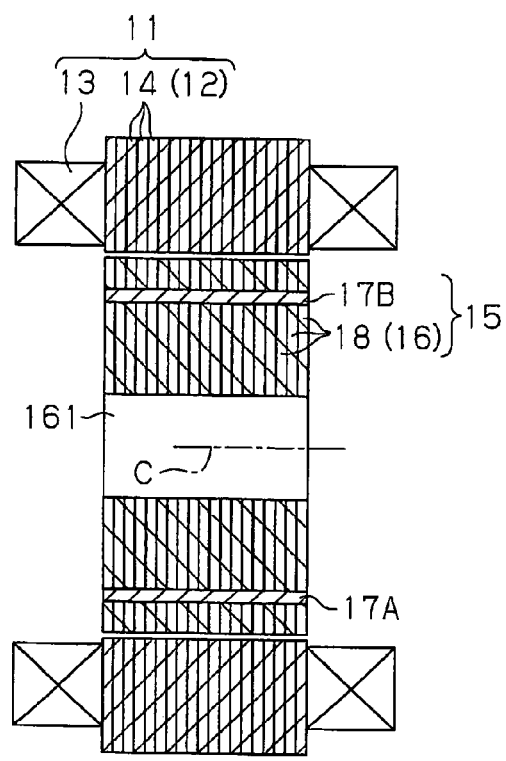
FIG. 2 is a side cross-sectional view of the stator and the rotor of FIG. 1A.

As shown in FIG. 1A, a stator 11 includes an annular core 12 and a coil 13 arranged in slots 122 formed between a plurality of teeth 121 arranged along the inner periphery of the core 12. In the present embodiment, the quantities of the teeth 121 and slots 122 are each eighteen. The slots 122 are arranged at an equal pitch (equiangular pitch) in the circumferential direction of the annular stator 11. As shown in FIG. 2, the core 12 is formed by stacking a plurality of core plates 14, which are magnetic bodies (steel plates). The coil 13 arranged in the slot 122 is wound into a wave winding.

Generally, the following relational equation is satisfied when expressing the number of poles as p (integer), the number of phases as m (integer), the number of slots per phase for each pole as q (every 0.5, such as q=0.5, 1, 1.5, 2, 2.5, ...), and the number of slots of the stator as K.

$$K = q \times p \times m$$

For instance, in a case in which there are three phases and q=1, the relationship between the number K of slots and the number p of poles is four poles and twelve slots, six poles and eighteen slots, eight poles and twenty-four slots, and so on. In a case in which there are three phases and q=1.5, the relationship between the number K of slots and the number p of poles is four poles and eighteen slots, six poles and twenty-seven slots, eight poles and thirty-six slots, and so on.

Figure 3:
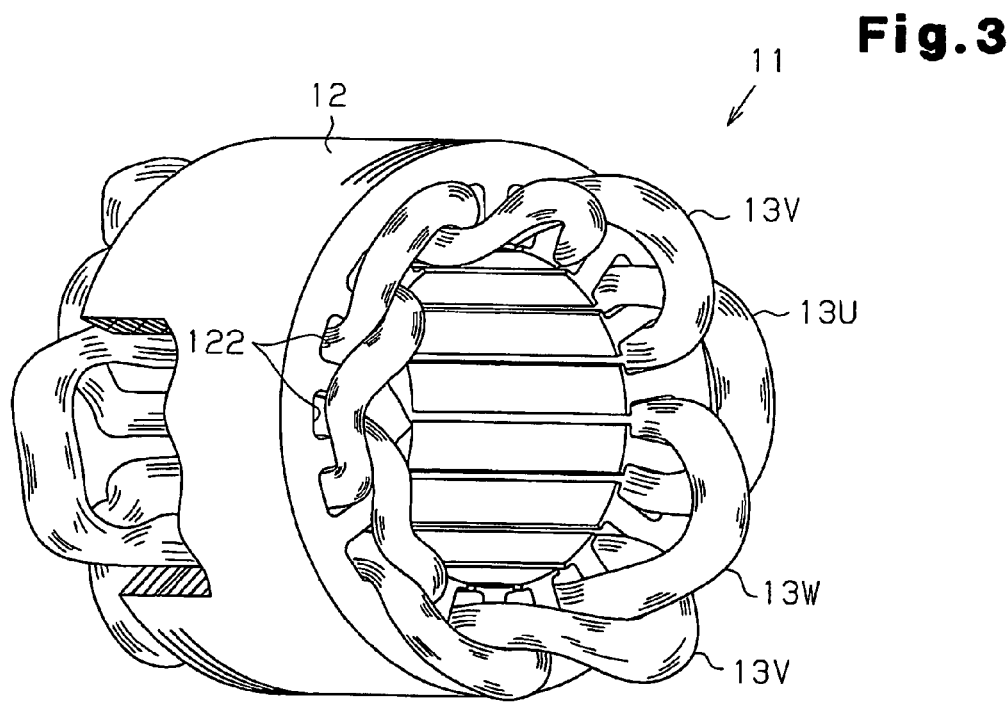
FIG. 3 is a perspective view of the stator of FIG. 1A.
Figure 4:
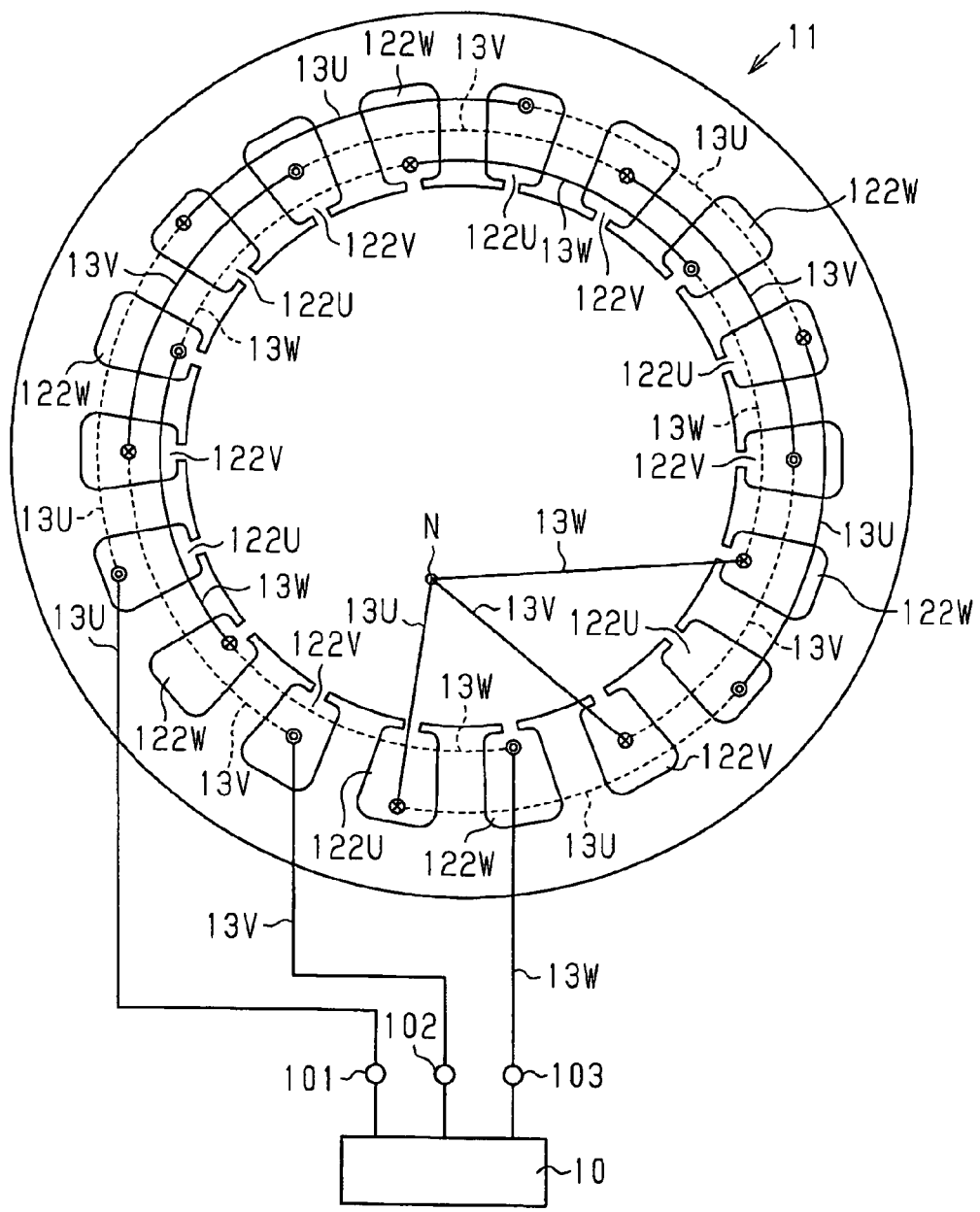
FIG. 4 is a view showing a wave winding of the windings in the stator of FIG. 1A.

The wave winding for six poles and eighteen slots will be described with reference to FIGS. 3 and 4. In the wave winding of the stator 11, a U-phase coil (indicated by reference character 13U), which is connected to a U-phase terminal 101 of an inverter 10, extends through a group of first slots (indicated by reference character 122U). A V-phase coil (indicated by reference character 13V), which is connected to a V-phase terminal 102 of the inverter 10, extends through a group of second slots (indicated by reference character 122V), and a W-phase coil (indicated by reference character 13W), which is connected to the terminal 103 of the W-phase of the inverter 10 extends through a group of third slots (indicated by reference character 122W). The portions of the coils 13U, 13V, 13W shown by solid lines in FIG. 4 indicates coil portions on the end face of the stator 11 that can be seen in this drawing. The portions of the coils 13U, 13V, and 13W shown by broken lines in FIG. 4 indicate the coil portions on the opposite end face of the stator 11 that cannot be seen in this drawing. The joined part of the solid line portion and the broken line portion of the coils 13U, 13V, and 13W extends through the slots 122U, 122V, and 122W. The reference character N indicates a neutral point connecting the terminating ends of each coil 13U, 13V, 13W.

As shown in FIG. 1A, a rotor 15 includes a core 16 and a plurality of flat permanent magnets 17A, 17B (six in the present embodiment) embedded in the core 16. The plurality of permanent magnets 17A, 17B all have the same shape and the same size. As shown in FIG. 2, the core 16 is formed by stacking a plurality of core plates 14 made of magnetic bodies (steel plates). A shaft hole 161 extends through the center of the core 16. An output shaft (not shown), which extends through the shaft hole 161, is fixed to the core 16.

As shown in FIG. 1A, plural sets of the first permanent magnet 17A and the second permanent magnet 17B are fitted into accommodating holes 162 extending through the core 16 parallel to the shaft hole 161. The permanent magnets 17A, 17B are embedded in the core 16 as magnetic poles that are adjacent in the circumferential direction of the rotor 15. The magnetic poles of two permanent magnets 17A, 17B adjacent in the circumferential direction of the rotor 15 differ from each other. That is, the permanent magnets 17A, 17B are embedded so as to alternately have different polarities in the circumferential direction.

Each permanent magnet 17A, 17B includes a first magnetic pole end 171, a second magnetic pole end 172, and a magnetic pole center 173 located between the first magnetic pole end 171 and the second magnetic pole end 172. A radial line 151A of the rotor 15 extending through the flat magnetic pole center 173 of the permanent magnet 17A is orthogonal to the permanent magnet 17A. Similarly, a radial line 151B of the rotor 15 extending through the flat magnetic pole center 173 of the permanent magnet 17B is orthogonal to the permanent magnet 17B. The radial lines 151A, 151B connecting to the rotational axis C of the rotor 15 are spaced by equiangular intervals (60°) about the rotational axis C. The permanent magnets 17A, 17B are spaced from the rotational axis C of the rotor 15 by an equal distance. Further, the permanent magnets 17A, 17B are arranged at an equal pitch in the circumferential direction of the rotor 15.

An opening 163 is provided in each of the two opposite ends (in the vicinity of the magnetic pole ends 171, 172) of the accommodating hole 162. A magnetic path short circuit prevention opening 163 is defined in each of the two opposite ends of the permanent magnets 17A, 17B in a state in which the permanent magnets 17A, 17B are accommodated in the accommodating hole 162.

As shown in FIG. 1B, circumferential portions 19A, 19b are defined on the outer circumference of the rotor 15. The circumferential portions 19A, 19b each have radius R and extend about the rotational axis C with an angular width A. The associated radial lines 151A, 151B extends through the center of each circumferential portion 19A, 19B. The radial line 151A intersects the circumferential center 191 of the circumferential portion 19A, and the radial line 151B intersects the circumferential center 191 of the circumferential portion 19B. That is, the angular width between a radial line 152, which extends through a first edge 192 of each circumferential portion 19A, 19B, and the associated radial line 151A, 151B is equal to the angular width between a radial line 153, which extends through a second edge 193 of each circumferential portion 19A, 19B and the associated radial line 151A, 151B. The circumferential surface extending between the first edge 192 and the second edge 193 about the rotational axis C is referred to as a virtual circumferential surface E.

The center 191 of each circumferential portion 19A, 19B in the circumferential direction lies along the associated radial line 151A, 151B. The radial lines 151A, 151B are spaced at equal angles (60°) about the rotational axis C. That is, the circumferential portions 19A, 19B are arranged at an equal pitch in the circumferential direction, and the circumferential portions 19A, 19B correspond to the magnetic pole center 173 of the magnetic poles 17A, 17B.

The circumferential portion 19A corresponding to the permanent magnet 17A and the circumferential portion 19B corresponding to the permanent magnet 17B are spaced apart from each other. Each circumferential portion 19A is connected to the adjacent circumferential portion 19B by a convex portion 20 bulging outward in the radial direction of the rotor 15.

The convex portion 20 connecting to the second edge 193 (or first edge 192) of each circumferential portion 19A, and the first-edge 192 (or second edge 193) of the adjacent circumferential portion 19B is formed by joining a first plane H1, a second plane H2, and a third plane H3. The first plane H1 is parallel to a plane H lying along the first edge 192 and the second edge 193. The second plane H2 connects a first edge of the first plane H1 and the first edge 192. The third plane H3 connects a second edge of the first plane H1 and the second edge 193. In FIG. 1B, the plane H, the first plane H1, the second plane H2, and the third plane H3 are each shown as a straight line representing an intersection with a virtual plane (plane of FIG. 1B) that is orthogonal to the rotational axis C. Hereinafter, the plane H may be referred to as line H, the first plane H1 may be referred to as first line H1, the second plane H2 may be referred to as second line H2, and the third plane H3 may be referred to as third line H3.

The first line H1 and the second line H2, which are adjacent to each other, form an angled portion H11 at an obtuse angle that is convex in the radially outward direction of the rotor 15. The first line H1 and the third line H3, which are adjacent to each other, form an angled portion H12 at an obtuse angle that is convex in the radially outward direction of the rotor 15.

The middle of the first line H1 of the convex portion 20 corresponds to a magnetic pole switching part 164 located between the first permanent magnet 17A and the second permanent magnet 17B. The gap G between the teeth 121 and the outer circumference of the rotor 15 (i.e., space between the virtual circumferential surface E and the outer circumference of the rotor 15) becomes largest at a portion corresponding to the magnetic pole switching part 164, which is located between two adjacent permanent magnets 17A, 17B. The distance between the outer circumference of the rotor 15 and the rotational axis C is thus minimal at the portion corresponding to the gap G.

Figure 5:
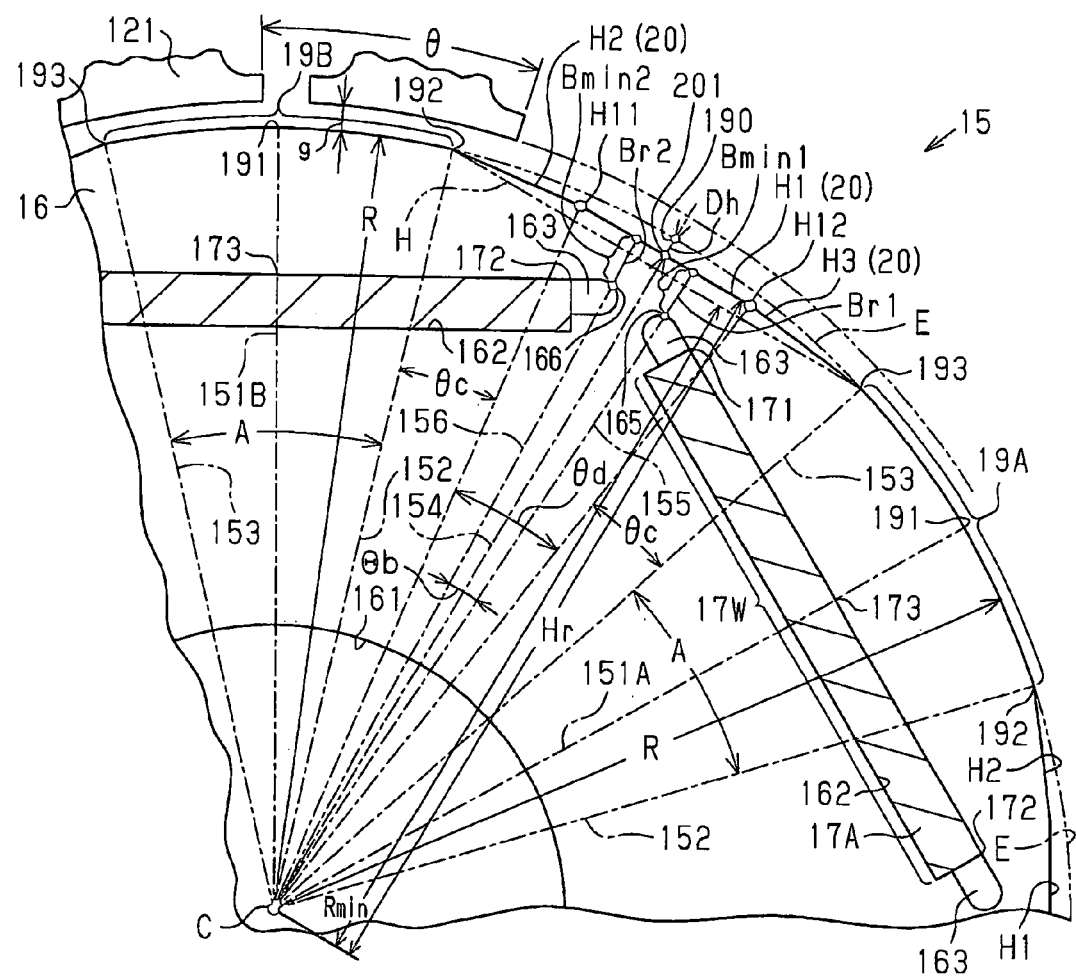
FIG. 5 is a further detailed cross-sectional view of FIG. 1B.

FIG. 5 shows a convex portion radial line 154 connecting the rotational axis C and a middle position 201 of the convex portion 20. The middle position 201 is located in the middle of the convex portion 20 between the first edge 192 and the second edge 193 of the circumferential portions 19A, 19B. That is, the convex portion radial line 154 extends so as to bisect the convex portion 20 in the circumferential direction. The convex portion radial line 154 is thus also hereinafter referred to as a bisector 154.

The length of the convex portion radial line 154 is the minimum distance between the convex portion 20 and the rotational axis C. Hereinafter, the minimum distance (i.e., length of the convex portion radial line 154) between the convex portion 20 and the rotational axis C is referred to as the minimum distance Rmin. In FIG. 5, Dh denotes the difference between a middle position 190 of the virtual circumferential surface E and the middle position 201 of the convex portion 20. The middle position 190 bisects the virtual circumferential surface E between the first edge 192 and the second edge 193. Further, the middle position 190 lies along an extension of the convex portion radial line 154. Dh represents the difference between the radius R of the circumferential portions 19A, 19B and the minimum distance Rmin.

The first line H1 is orthogonal to the convex portion radial line 154 in the virtual plane (plane of FIG. 1B) and spaced from the middle position 190 by difference Dh in the radial direction. Dh is hereinafter referred to as depth Dh. The distance from the middle position 201 of the first line H1 to the first edge (first angled portion H11) is the same as the distance from the middle position 201 to the second edge (second angled portion H12) of the first line H1. Therefore, the second line H2 and the third line H3 have the same angular width θc about the rotational axis C.

The convex portion 20 projects outwardly in the radial direction of the rotor 15 within a range between the inner side of the virtual circumferential surface E and the outer side of the line H. The virtual circumferential surface E extends along circumferential portions 19A, 19B and has a radius R. The line H connects the first edge 192 and the second edge 193. That is, the convex portion 20 projects outwardly in the radial direction of the rotor 15 within a region (region excluding the virtual circumferential surface E and the line H) between the virtual circumferential surface E and the line H. That is, the angled portions H11, H12 (both edges of the first line H1) are located inward in the radial direction from the virtual circumferential surface E and located outward in the radial direction from the line H. The second line H2 and the third line H3 are mirror images (symmetric) with respect to the bisector 154, which bisects the convex portion 20 in the circumferential direction. Further, and the two angled portions H11, H12 are mirror images (symmetric) with respect to the bisector 154.

Figure 6:
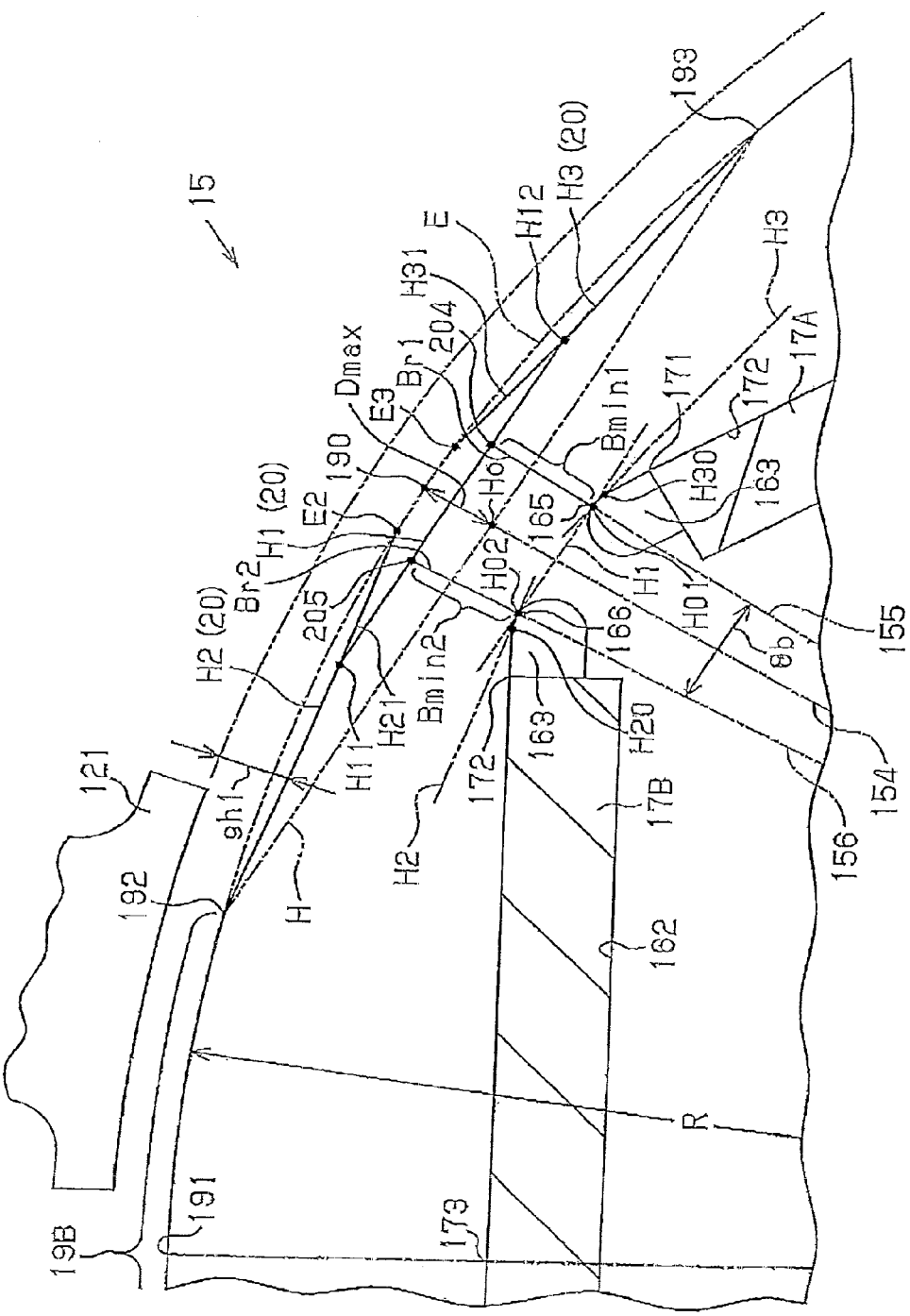
FIG. 6 is an enlarged cross-sectional view of FIG. 5.

As shown in FIG. 6, extension lines H21, H31 are defined by extending the lines H2, H3 from the angled portions H11, H12 to positions E2, E3 at which the lines H2, H3 intersect the virtual circumferential surface E. The lines H2, H3, which are located on opposite sides of the line H1, are longer than the extension lines H21, H31.

Each convex portion 20 is formed by connecting the first line H1, the second line H2, and the third line H3, and each convex portion 20 have the same shape and same size.

The minimum distance between the convex portion 20 and the rotational axis C on line H is referred to as the minimum distance Hr (see FIG. 5).

In FIG. 6, Dmax represents the linear distance between a middle position Ho and the middle position 190 and is the difference between the radius R and the minimum distance Rmin. Dmax is hereinafter referred to as a virtual maximum difference Dmax. The virtual maximum difference Dmax is expressed by Dmax=R×{1−cos([(360°/p)−A]/2)}, and the depth Dh is smaller than the virtual maximum difference Dmax. In the equation, A represents the angular width of each circumferential portion 19A, 19B.

As shown in FIG. 6, a line extending from the rotational axis C to the first line H1 and intersecting a wall surface of the short circuit prevention opening 163, which is part of the accommodating hole 162 for accommodating the first permanent magnet 17A, includes a line segment Br1 connecting a point 165 on the wall surface of the short circuit prevention opening 163 and a point 204 on the first line H1. Similarly, a line extending from the rotational axis C to the first line H1 and intersecting a wall surface of the short circuit prevention opening 163, which is part of the accommodating hole 162 for accommodating the second permanent magnet 17B, includes a line segment Br2 connecting a point 166 on the wall surface of the short circuit prevention opening 163 and a point 205 on the first line H1.

Bmin1 represents the linear distance between point 165 and point 204, and Bmin2 represents the linear distance between point 166 and point 205, where Bmin1=Bmin2.

In FIGS. 5 and 6, Θb represents the angular width between a radial line 155, which connects the rotational axis C and the initial point 165, and a radial line 156, which connects the rotational axis C and the initial point 166. That is, Θb represents the angular width between the initial point 165 and the initial point 166 about the rotational axis C. The initial point 165 is located on one of the adjacent accommodating holes 162 that is separated by the line seament Br1 from the convex portion 20. The initial point 166 is located on the other one of the accommodating holes 162 that is separated by the line segment Br2 from the convex portion 20. Here, Θb is referred to as inter-bridge angle Θb.

The initial points 165, 166 determining the inter-bridge angle Θb are defined as below. A point obtained when the line H1 undergoes parallel displacement and contacts the wall surface of the accommodating hole 162 for accommodating the first permanent magnet 17A is tentatively referred to as H01, and a point obtained when the line H3 undergoes parallel displacement and contacts the wall surface of the accommodating hole 162 for accommodating the first permanent magnet 17A is tentatively referred to as H30. Among the two points H01, H30, the one closer to the associated lines H1, H3 is used as the initial point 165. A point obtained when the line H1 undergoes parallel displacement and contacts the wall surface of the accommodating hole 162 for accommodating the second permanent magnet 17B is tentatively referred to as H02, and a point obtained when the line H2 undergoes parallel displacement and contacts the wall surface of the accommodating hole 162 for accommodating the second permanent magnet 17B is tentatively referred to as H20. Among the two points H02, H20, the one closer to the associated lines H1, H2 is used as the initial point 166. FIG. 6 shows chain double-dashed lines obtained when the lines H1, H2, H3, and H3 undergo parallel.

Depending on the shape of the accommodating hole 162 (opening 163), there may be a plurality of or an infinite number of points H01, H30, H02, or H20. In such a case, there would be a plurality of angular widths Θb. The inter-bridge angle Θb represents the maximum one of the angle widths about the rotational axis C formed by the initial point 165 corresponding to the line segment Br1 and the initial point 166 corresponding to the line segment Br2.

A bar graph of FIG. 7A shows examples in which the torque constant of the rotor 15 and the torque constants of first to fourth comparative rotors 21-24, which are shown in FIG. 21A to FIG. 21D and which serve as comparative examples, are obtained by performing a finite element method (FEM) analysis. The torque constant is a value obtained by dividing an average value of the output torque of the rotating electric machine by an effective value of the current. The bar graph of FIG. 7B shows an example of the FEM analysis of the torque ripple of the rotor 15 and the torque ripples of the first to the fourth comparative rotors 21 to 24. The torque ripple is the size of the fluctuation width of the output torque. The rotor 15 and the first to the fourth comparative rotors 21 to 24 are all incorporated in the same stator 11. The arrangement and size of the permanent magnets 17A, 17B are the same as the rotor 15 for all of the first to the fourth comparative rotors 21 to 24.

The common conditions in the above FEM analysis examples are as follows:

width 17W (shown in FIG. 5) of the permanent magnets 17A, 17B is smaller than the radius R of the circumferential portions 19A, 19B of the core 16 (the rotor 15);

air gap g (size of the gap between the circumferential portions 19A, 19B and teeth 21, shown in FIG. 5)=0.5 mm;

number of poles p=6; and number of slots 122=p×3=18.

Figure 21A:
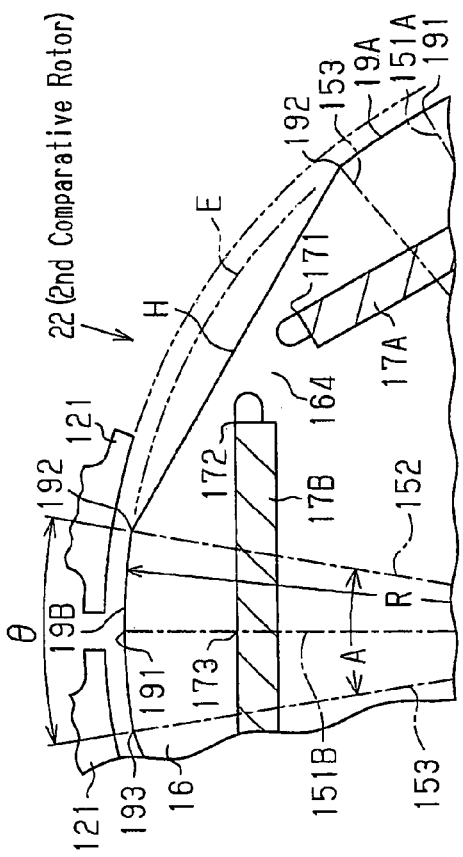
FIG. 21A is a partial front cross-sectional view showing a first comparative rotor 21.
Figure 21B:
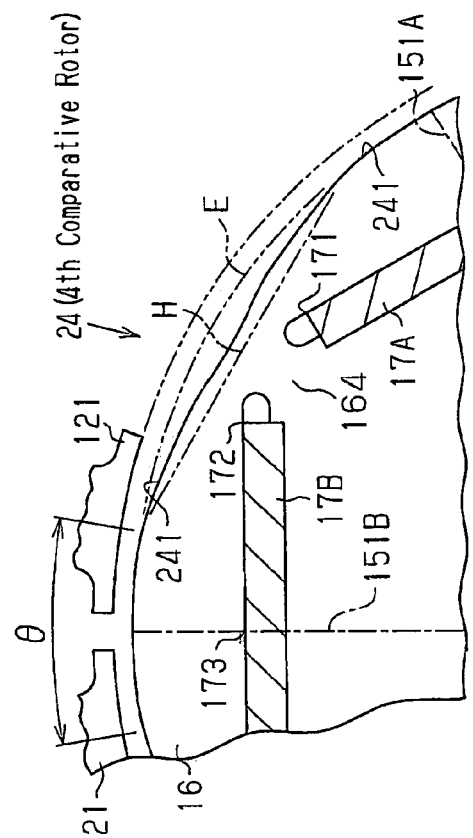
FIG. 21B is a partial front cross-sectional view showing a second comparative rotor 22.
Figure 21C:
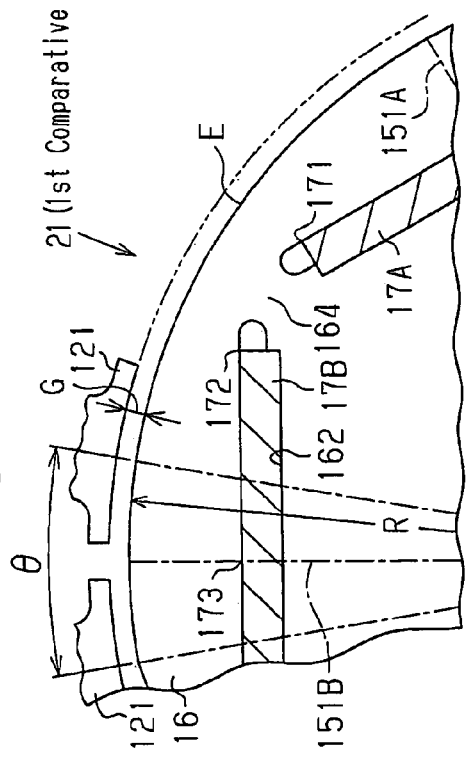
FIG. 21C is a partial front cross-sectional view showing a third comparative rotor 23.
Figure 21D:
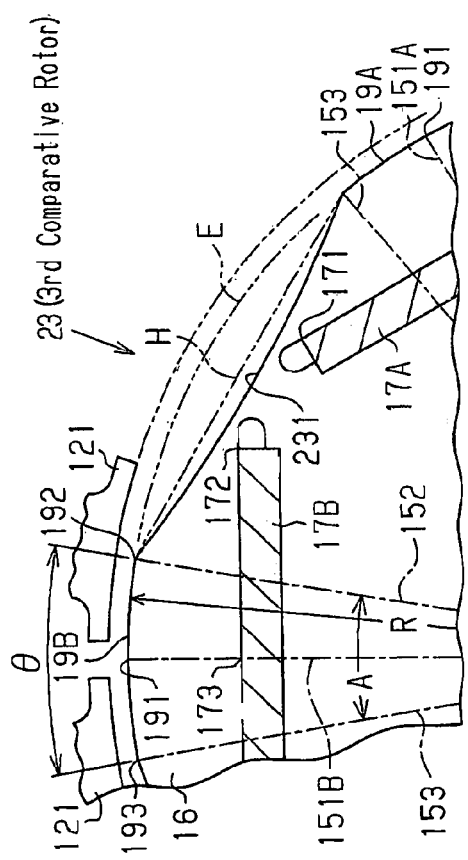
FIG. 21D is a partial front cross-sectional view showing a fourth comparative rotor 24.

As shown in FIG. 21A, the outer circumference of the first comparative rotor 21 is the virtual circumferential surface E of radius R. As shown in FIG. 21B, the outer circumference of the second comparative rotor 22 includes circumferential portions 19A, 19B of radius R and the plane H (line H) connecting the adjacent circumferential portion 19A and circumferential portion 19B. As shown in FIG. 21C, the outer circumference of the third comparative rotor 23 includes circumferential portions 19A, 19B of radius R and a concave portion 231 connecting the adjacent circumferential portion 19A and the circumferential portion 19B. The concave portion 231 is an arc surface depressed inwardly in the radial direction from the plane H. As shown in FIG. 21D, the outer circumference of the fourth comparative rotor 24 has a sinusoidal wave shape (sinusoidal wave shaped part 241) so that the distance between the outer circumference of the fourth comparative rotor 24 and the rotational axis C becomes minimal at the magnetic pole switching part 164 between the adjacent permanent magnets 17A, 17B and the distance between the outer circumference of the fourth comparative rotor 24 and the rotational axis C becomes maximal at the magnetic pole center 173 between the magnetic pole ends 171, 172. The length of the radial lines 151A, 151B of the fourth comparative rotor 24 is R. The minimum distance between the outer circumference of the fourth comparative rotor 24 and the rotational axis C is greater than the minimum distance between the outer circumference of the second comparative rotor 22 and the rotational axis and less than the minimum distance between the outer circumference of the rotor 15 and the rotational axis C.

Bar b1 in the graph of FIG. 7A shows the torque constant for the first comparative rotor 21 in FIG. 21A as being 1. Bar b0 in the graph of FIG. 7A represents the torque constant of the rotor 15 as a ratio with respect to bar b1. Bar b2 represents the torque constant of the second comparative rotor 22 in FIG. 21B as a ratio with respect to bar b1. Bar b3 represents the torque constant of the third comparative rotor 23 in FIG. 21C as a ratio with respect to bar b1. Bar b4 represents the torque constant of the fourth comparative rotor 24 in FIG. 21D as the ratio with respect to bar b1.

Bar d1 in the graph of FIG. 7B represents the torque ripple of the first comparative rotor 21 as 1. Bar d0 represents the torque ripple of the rotor 15 as the ratio with respect to bar d1. Bar d2 represents the torque ripple of the second comparative rotor 22 as the ratio with respect to bar d1. Bar d3 represents the torque ripple of the third comparative rotor 23 as the ratio with respect to bar d1. Bar d4 represents the torque ripple of the fourth comparative rotor 24 as the ratio with respect to bar d1.

Figure 8A:
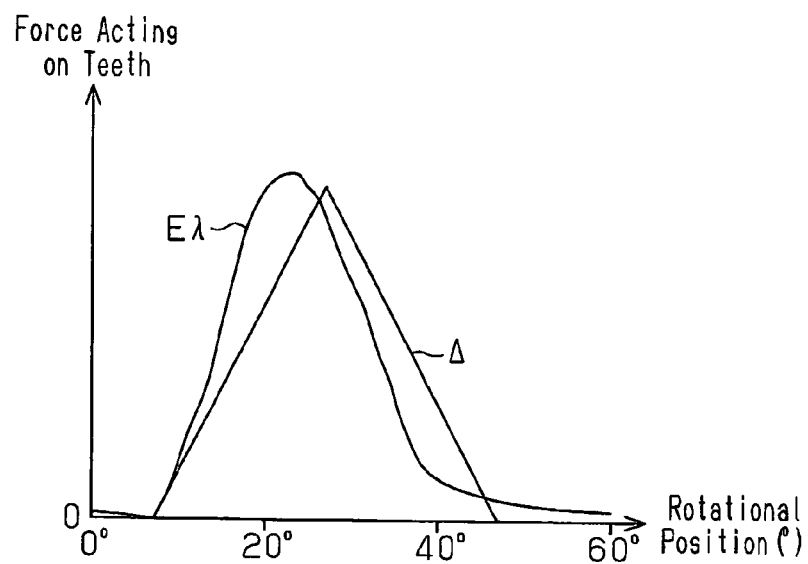
FIG. 8A is a graph showing the force acting on the teeth.
Figure 8B:
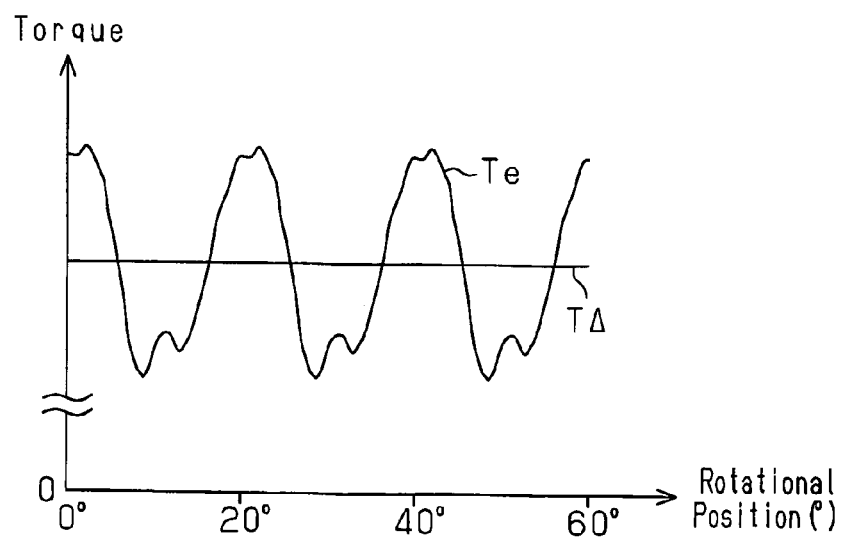
FIG. 8B is a graph showing the torque fluctuation.

The graph of FIG. 8A shows the relationship between the rotation position of the rotor and the force acting on any one of the teeth 121. The waveform Δ shows an ideal example. The waveform Δ and the horizontal axis form an isosceles triangle. The base of which isosceles triangle shows that the angular spacing between the starting end and the terminating end on the horizontal axis is 40°. A horizontal line TΔ shown in the graph of FIG. 8B is obtained by synthesizing such waveform Δ relating to all the teeth 121. That is, if the waveform of the force acting on one tooth 121 is waveform Δ, the output torque becomes constant (TΔ), and the torque ripple becomes zero.

The waveform Eλ in the graph of FIG. 8A shows the relationship between the rotation position of the first comparative rotor 21 of FIG. 21A and the force acting on any one of the teeth 121 of the first comparative rotor 21. The synthesized waveform Te shown in the graph of FIG. 8B is obtained by synthesizing such waveform Eλ related to all the teeth 121 of the first comparative rotor 21. That is, if the force acting on one tooth 121 is the force shown by the waveform Eλ, the output torque in which the torque ripple is not zero is obtained. That is, the torque ripple of the rotating electric machine becomes smaller as the shape of the waveform Eλ becomes closer to the shape of the waveform Δ.

With regards to the rotor 15, the torque ripple rate Ri is calculated from the result of the FEM analysis conducted under the above common analysis conditions and a condition of inter-bridge angle Θb=5.2°. The torque ripple rate Ri is a value obtained by dividing the torque ripple (size of fluctuation width of the output torque) by an average value of the output torque. The torque ripple rate R1 of the rotor 15 is smaller than the torque ripple rate resulting from the FEM analysis under the above common analysis conditions and the condition of the inter-bridge angle Θb=10° for the first comparative rotor 21 of FIG. 21A. A ratio Rx/Ri of a certain torque ripple rate Rx with respect to the torque ripple rate Ri of the FEM analysis result under the above common analysis conditions and the condition of the inter-bridge angle being Θb=5.2°, using the first comparative rotor 21 of FIG. 21A is hereinafter referred to as a torque ripple rate ratio. The torque ripple rate ratio Rx/Ri is directly proportional to the torque ripple rate Rx.

Curve Z1 in the graph of FIG. 9A shows the distribution of the magnetic flux density at the outer circumferential surface of the rotor 15 when the angular width is A=28°, the angular width is θc=13°, and the inter-bridge angle Θb is 5.2°. The horizontal axis represents the angular position between the middle position 201 of the convex portion 20 corresponding to the magnetic pole switching part 164 and the middle position 201 of the adjacent convex portion 20, and the vertical axis represents the magnetic flux density. The angular position of the middle position 201 is 0° or 60°. In the graph of FIG. 9C, Eλ1 shows the relationship between the rotation position of the rotor 15 and the force acting on one tooth 121 of the rotor 15 when the inter-bridge angle Θb is 5.2°.

Curve Z2 in the graph of FIG. 9B shows the distribution of the magnetic flux density at the outer circumferential surface of the rotor 15 when the angular width is A=28°, the angular width is θc=13°, and the inter-bridge angle Θb is 12°. The horizontal axis represents the angular position between the middle position 201 of the convex portion 20 corresponding to the magnetic pole switching part 164 and the middle position 201 of the adjacent convex portion 20, and the vertical axis represents the magnetic flux density. In the graph of FIG. 9D, Eλ2 shows the relationship between the rotation position of the rotor 15 and the force acting on one tooth 121 of the rotor 15 when the inter-bridge angle Θb is 12°.

FIG. 9A to FIG. 9D each show the results obtained through the FEM analysis. The region of the outer circumferential-surface of the rotor 15 where the magnetic flux density becomes zero (region of a range greater than zero on the horizontal axis indicating the position on the outer circumferential surface of the rotor 15) does not exist in FIG. 9A, but the region of the outer circumferential surface of the rotor 15 where the magnetic flux density becomes zero exists in FIG. 9B. Curve Eλ1 is closer to the shape of the waveform Δ than curve Eλ2. That is, the torque ripple becomes smaller when the region that becomes zero is not present in the distribution of the magnetic flux density (hereinafter referred to as the state without auxiliary magnetic pole; see FIG. 9A and FIG. 9C), compared to when the region that becomes zero is present in the distribution of the magnetic flux (hereinafter referred to as the state with auxiliary magnetic pole; see FIG. 9B and FIG. 9D).

The angular width φ shown in FIG. 1B is the angular width about the rotational axis C between the short circuit prevention opening 163 adjacent to the first permanent magnet 17A and the adjacent short circuit prevention opening 163 adjacent to the second permanent magnet 17B. That is, the angular width φ is the angle between the radial lines 157, 158 (radial line with the rotational axis C as the center) linearly contacting the two adjacent short circuit prevention openings 163. The size of the angular width φ is less than or equal to the size of the inter-bridge angle Θb. The state without auxiliary magnetic pole is recognized by the FEM analysis even for the angular width φ of 10°.

Figure 10:
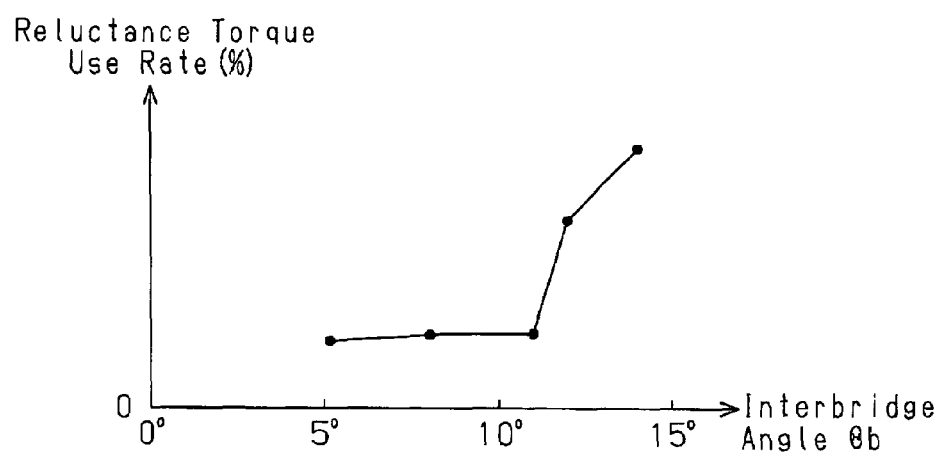
FIG. 10 is a graph showing a reluctance torque usage rate.

In the state with an auxiliary magnetic pole, the percentage (hereinafter referred to as reluctance torque usage rate) occupied by the reluctance torque with respect to the average value of the output torque increases with respect to the state without auxiliary magnetic pole. According to the FEM analysis result in the graph of FIG. 10, the reluctance torque usage rate suddenly increases when the inter-bridge angle Θb exceeds 10°. The dots on the graph of FIG. 10 are the actual data.

In the structure that effectively uses the reluctance torque in the state with auxiliary magnetic pole (e.g., structure described in FIG. 1 of Japanese Laid-Open Patent Publication No. 2004-260972), the force Eλ acting on one tooth deforms, whereby the shape of the force Eλ greatly differs from the shape of the waveform Δ, and the torque ripple becomes unsatisfactory.

In the present invention, there is no auxiliary magnetic pole (FIG. 9A and FIG. 9C). Thus, increase in the average value of the output torque due to reluctance torque is decreased to approach the force Eλ acting on one tooth to the waveform Δ and reduce the torque ripple.

Figure 11:
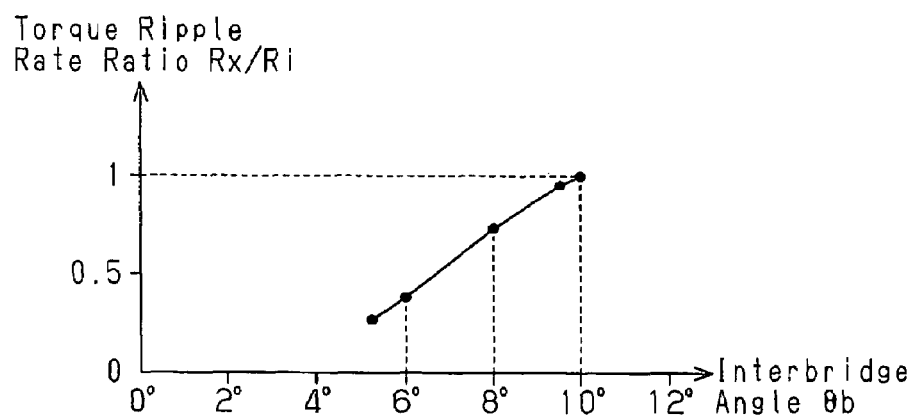
FIG. 11 is a graph showing a relationship between an inter-bridge angle $\Theta b$ and a torque ripple rate ratio Rx/Ri.

The graph of FIG. 11 shows the change in the torque ripple rate ratio Rx/Ri in accordance with the inter-bridge Θb. The angular width A is 28° and the angular width θc is 13°. FIG. 11 shows the result obtained through the FEM analysis, the dots on the graph of FIG. 11 being the actual data. According to the graph of FIG. 11, the torque ripple rate ratio Rx/Ri becomes less than or equal to 1 if the inter-bridge angle Θb is les than or equal to 10°.

The main magnet width may be enlarged and the lowering of average value of the output torque can be suppressed by having the inter-bridge angle Θb be less than or equal to 10°.

Figure 12A:
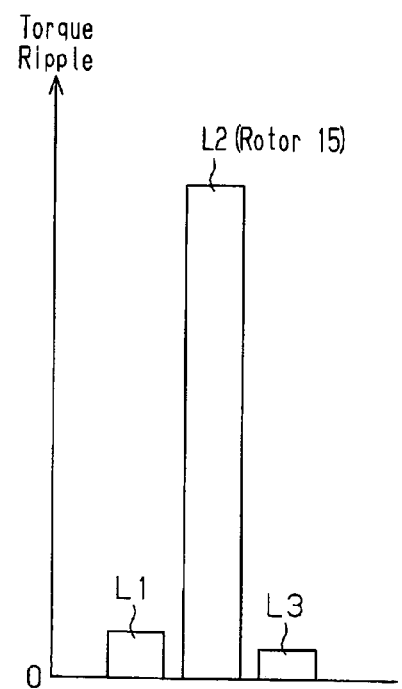
FIGS. 12A and 12B are bar graphs showing an order component ratio of the torque ripple.

FIG. 12A is a bar graph obtained by performing Fourier series expansion on the output torque when the convex portion 20 is used and shows the order component ratio of the torque ripple in a specific order obtained therefrom. The inter-bridge angle Θb is set to 5.2° and the angular width A is set to 28°. The depth Dh is set to 0.3 mm and the angular width θc is set to 13°.

Figure 12B:
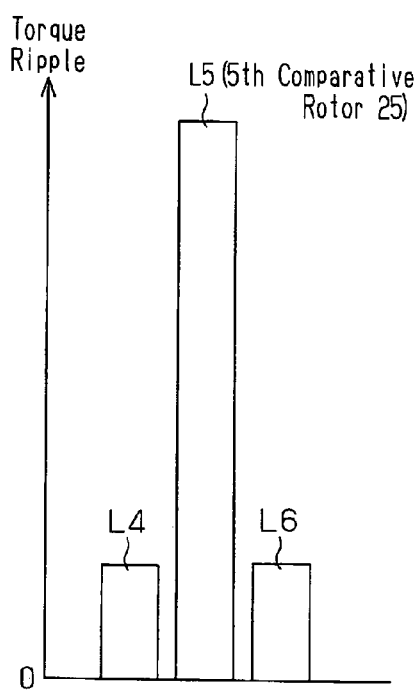
Figure 17:
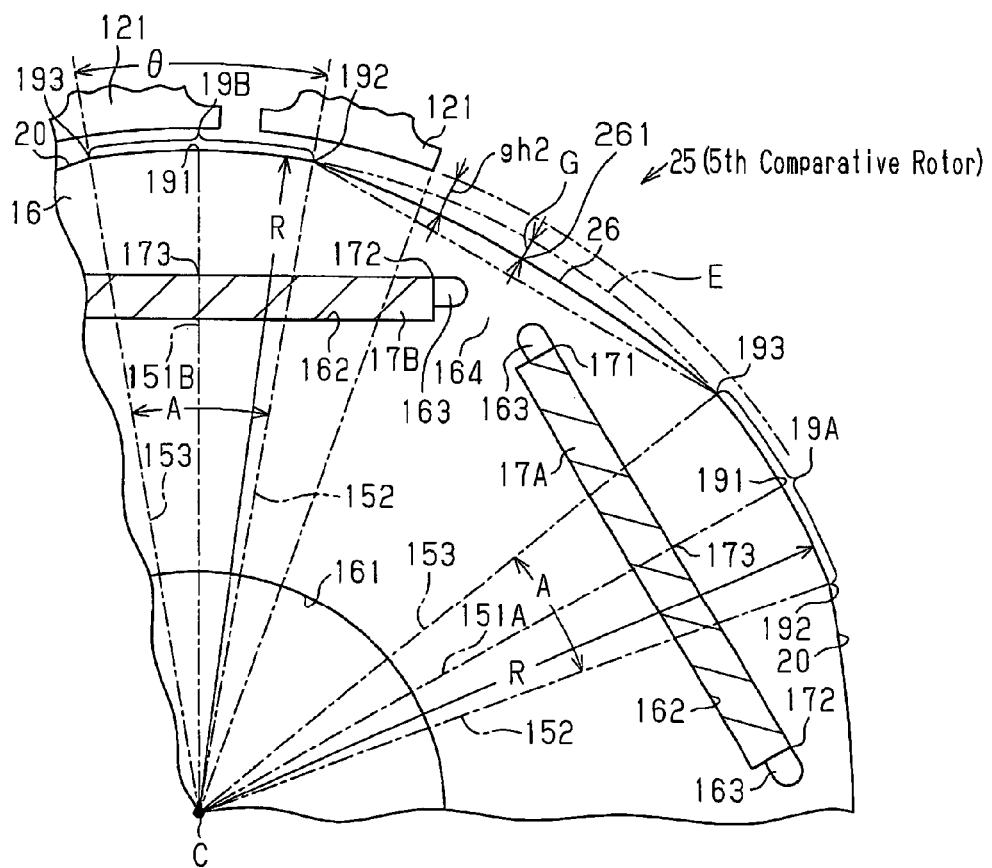
FIG. 17 is a partial cross-sectional view of the fifth comparative rotor 25.

FIG. 12B is a bar graph obtained by performing Fourier series expansion on the output torque of the fifth comparative rotor 25 shown in FIG. 17, and shows the order component ratio of the torque ripple in a specific order obtained therefrom. The inter-bridge angle Θb is set to 5.2° and the angular width A is set to 26°. The depth Dh is set to 0.5 mm. FIG. 12A and FIG. 12B are the results obtained through the FEM analysis.

The outer circumferential surface of the fifth comparative rotor 25 shown in FIG. 17 is formed by connecting the adjacent circumferential portion 19A and circumferential portion 19B with the convex portion 26. The convex portion 26 is shaped so as to project outwardly in the radial direction of the rotor 15.

The convex portion 26 connecting to the second edge 193 (or first edge 192) of the first circumferential portion 19A and the first edge 192 (or second edge 193) of the second circumferential portion 19B is an arc circumferential surface having a radius larger than the radius R of the circumferential portions 19A, 19B. Each convex portion 26 has the same shape and size. Therefore, the convex portion 26 projects outwardly in the radial direction of the rotor 15 within a range from the radially inner side of the virtual circumferential surface E of the radius R including the circumferential portions 19A, 19B to the radially outer side from the plane H connecting the first edge 192 and the second edge 193. That is, the convex portion 26 projects outwardly in the radial direction of the rotor 15 within a region (excluding the virtual circumferential surface E and the plane H) between the virtual circumferential surface E and the plane H.

A projecting end 261 of the convex portion 26 corresponds to the magnetic pole switching part 164 located between the first permanent magnet 17A and the second permanent magnet 17B. That is, with regards to the size (i.e., spacing between the virtual circumferential surface E and the outer circumference of the fifth comparative rotor 25) of the gap between the teeth 121 and the outer circumference of the fifth comparative rotor 25, the gap G corresponding to the magnetic pole switching part 164 is the largest. That is, the radius of the fifth comparative rotor 25 is the smallest at the portion corresponding to the gap G.

Bar L1 in FIG. 12A shows the order component ratio of the torque ripple in the basic order (=18). Bar L2 shows the order component ratio of the torque ripple in the order (=36) twice the basic order, and bar L3 shows the order component ratio of the torque ripple in the order (=54) thrice the basic order.

Bar L4 in FIG. 12B shows the order component ratio of the torque ripple in the basic order (=18). Bar L5 shows the order component ratio of the torque ripple in the order (=36) twice the basic order, and bar L6 shows the order component ratio of the torque ripple in the order (=54) triple the basic order. The order component ratio of the torque ripple in bar L4 is 1.

According to the FEM analysis result of FIG. 12A and FIG. 12B, the order component in the basic order (=18) that greatly affects the torque ripple is smaller for the rotor 15 (bar L1 of FIG. 12A) including the convex portion 20 than for the fifth comparative rotor 25 (bar L4 of FIG. 12B) in FIG. 17.

Figure 13:
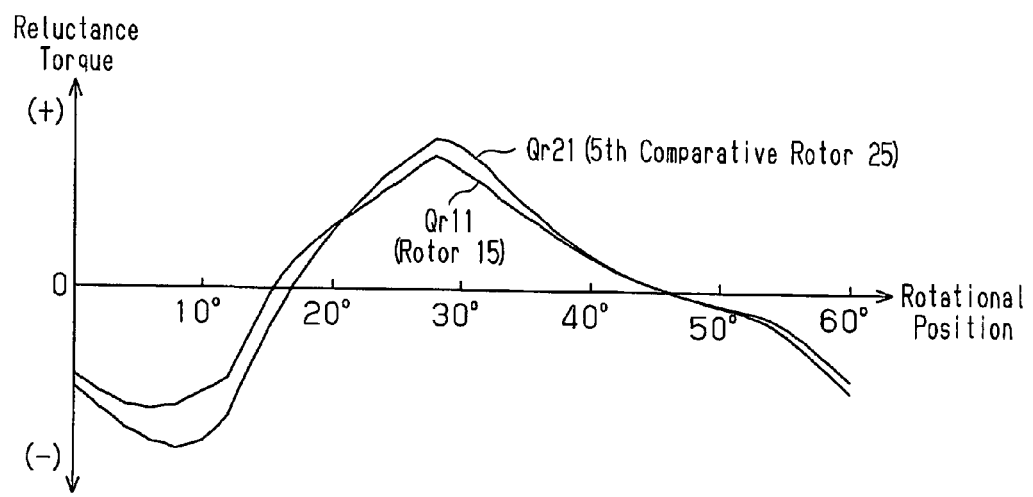
FIG. 13 is a graph showing change in reluctance torque related to one tooth.

FIG. 13 is a graph showing the change in the reluctance torque related to a single tooth 121. Curve Qr11 shows the change in the reluctance torque of when the rotor 15 including the convex portion 20 is used, and curve Qr21 shows the change in the reluctance torque of when the fifth comparative rotor 25 of FIG. 17 is used.

Figure 14A:
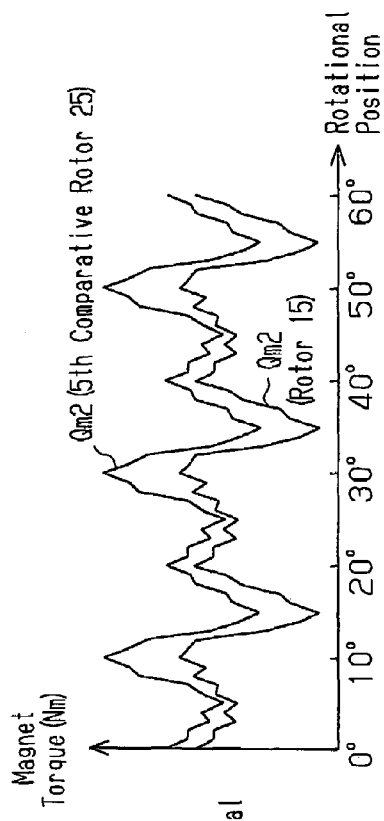
FIG. 14A is a graph showing change in synthesized reluctance torque.

Curve Qr12 in the graph of FIG. 14A shows the change in the synthesized reluctance torque obtained by synthesizing curve Qr11 of FIG. 13 related to each tooth 121 (18) of the rotor 15. Curve Qr22 of FIG. 13 shows the change in the synthesized reluctance torque obtained by synthesizing curve Qr21 of FIG. 13 related to the each teeth 121 (18) of the fifth comparative rotor 25.

Figure 14B:
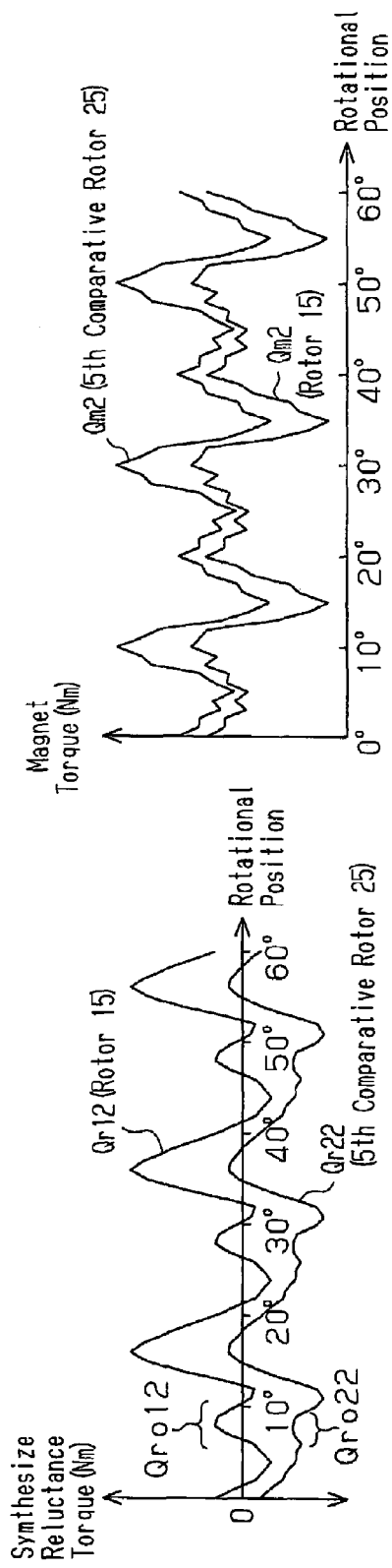
FIG. 14B is a graph showing change in magnet torque.

Curve Qm1 in the graph of FIG. 14B shows the change in the torque (hereinafter referred to as magnet torque) related to the permanent magnets 17A, 17B of when the rotor 15 is used. Curve Qm2 is a graph showing the change in the magnet torque related to the permanent magnets 17A, 17B of when the fifth comparative rotor is used.

Figure 14C:
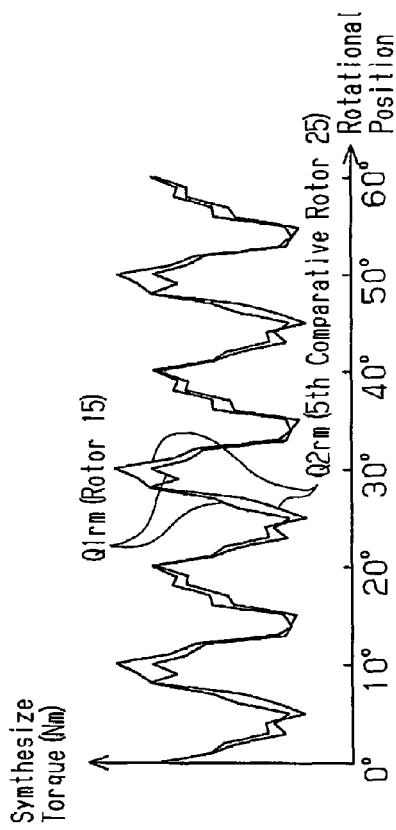
FIG. 14C is a graph showing the synthesized torque waveform.
Figure 16:
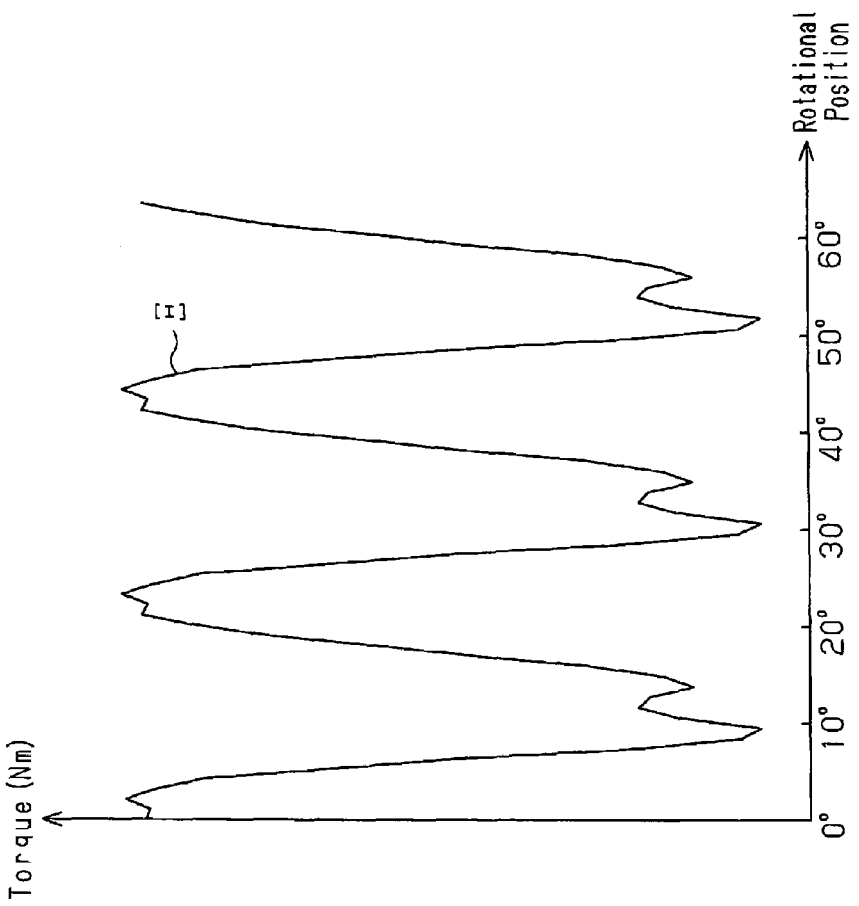
FIG. 16 is a graph showing fluctuation of output torque of a first comparative rotor 21.

Curve Q1rm in the graph of FIG. 14C is a torque waveform synthesizing curve Qr12 of FIG. 14A and curve Qm1 of FIG. 14B. Curve Qr2m in the graph of FIG. 14C is a torque waveform synthesizing curve Qr22 of FIG. 14A and curve Qm2 of FIG. 14B. That is, curve Q1rm is the torque waveform obtained by the FEM analysis when the rotor 15 including the convex portion 20 is used, and curve Q2rm is the torque waveform obtained by the FEM analysis when the fifth comparative rotor 25 of FIG. 17 is used. Curve Ξ in the graph of FIG. 16 is the torque waveform obtained by the FEM analysis when the first comparative rotor 21 of FIG. 21A is used. The difference between torque ripple in curve Q1rm of the torque waveform and the torque ripple in curve Ξ of the torque waveform is apparent.

Comparing the curves Q1rm, Q2rms, the torque ripple represented by curve Q1rm is apparently smaller than the torque ripple represented by curve Q2rm. This difference is based on the difference between the raised degree of the raised part Qro12 in curve Qr12 of FIG. 14A and the raised degree of the raised part Qro22 in curve Qr22. The difference in the raised degree of the raised parts Qro12, Qro12 is mainly due to the difference in the change of air gap gh1 (size of the gap between the convex portion 20 and the teeth 21, shown in FIG. 6) and the change in the air gap gh2 (size of the gap between the convex portion 26 and the teeth 121, shown in FIG. 17).

Figure 15A:
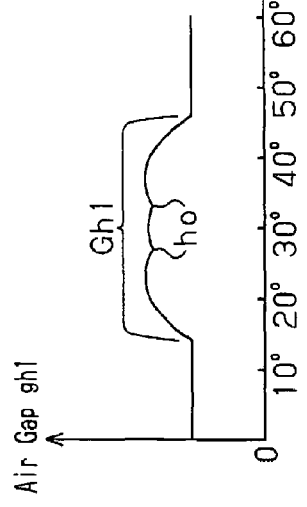
FIG. 15A is a graph showing change in an air gap gh1 of the rotor 15 of FIG. 6.
Figure 15B:
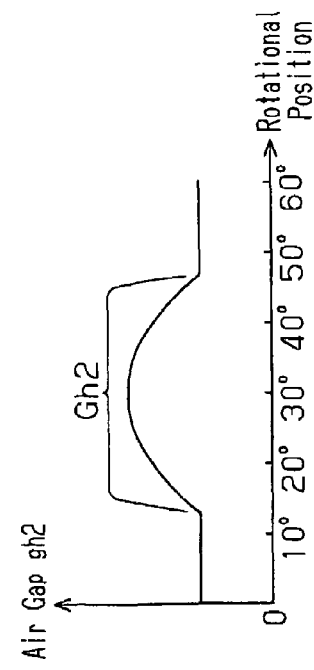
FIG. 15B is a graph showing change in an air gap gh2 of a fifth comparative rotor 25 of FIG. 17.

Curve Gh1 in the graph of FIG. 15A shows the change in the air gap gh1, and curve Gh2 in the graph of FIG. 15B shows the change in the air gap gh2. The change in the air gap gh2 represented by curve Gh2 has a pattern of transitioning from a monotone increase to a maximum and then transitioning to a monotone decrease. The change in the air gap gh1 represented by curve Gh1 has a pattern including two inverting portions ho that suddenly inverts from monotone decrease to monotone increase. The two inverting portions ho is produced by the presence of the angled portions H11, H12. That is, the presence of the angled portions H11, H12 increases the rise of the raised part Qro12 in curve Qr12.

The synthesizing of curve Qr12 of the synthesized reluctance torque having the raised part Qro12 and curve Qm1 of the magnet torque reduces the torque ripple, as shown by curve Q1rm of FIG. 14C. The synthesizing of curve Qr22 of the synthesized reluctance torque having the raised part Qro22 and curve Qm2 of the magnet torque also reduces the torque ripple, as shown by curve Q2rm of FIG. 14C. However, the extent of reduction of the torque ripple shown by curve Q1rm in FIG. 14C is small compared to the extent of reduction of the torque ripple shown by curve Q2rm of FIG. 14C.

The difference between the torque ripple of curve Q1rm and the torque ripple of curve Q2rm will now be described in detail based on FIG. 18 to FIG. 20.

The following two points are given as reasons for the difference between the torque ripple of curve Q1rm and the torque ripple of curve Q2rm.

<1> The difference between the amplitude of the component of the basic order (18th order) in the reluctance torque and the amplitude of the component of the basic order (18th order) in the magnet torque is smaller for curve Q1rm than for curve Q2rm.

<2> The difference between the phase of the component of the basic order (18th order) in the reluctance torque and the phase of the component of the basic order (18th order) in the magnet torque is closer to the antiphase for curve Q1rm than for curve Q2rm.

Figure 18A:
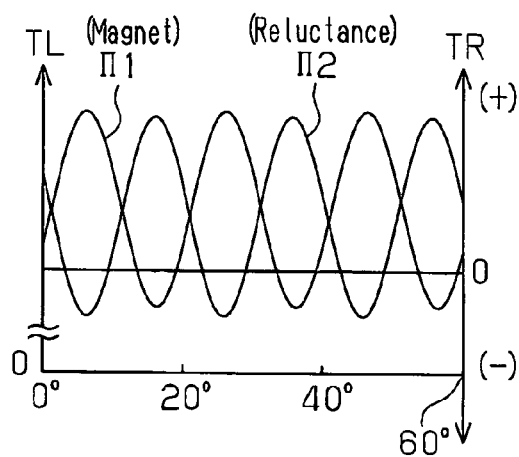
FIGS. 18A and 18B are graphs showing the difference between a torque ripple at a curve Q1*rm* and a torque ripple at a curve Q2*rm*.

Curve Π1 in the graph of FIG. 18A represents the waveform of the component of the basic order (18th order) in the magnet torque when the rotor 15 is used, and curve Π2 represents the waveform of the component of the basic order (18th order) in the reluctance torque when the rotor 15 is used. Curve Π1 is on the coordinates indicated by the horizontal axis (rotation position) and the vertical axis TL (size of torque) on the left side, and curve Π2 is on the coordinates indicated by the horizontal axis (rotation position) and the vertical axis TR (size of torque) on the right side.

Figure 18B:
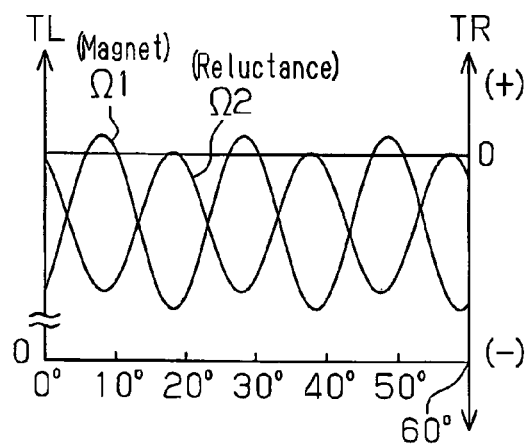

Curve Ω1 in the graph of FIG. 18B represents the waveform of the component of the basic order (18th order) in the magnetic torque when the fifth comparative rotor 25 (refer to FIG. 17) is used, and curve Ω2 represents the waveform of the component of the basic order (18th order) in the reluctance torque of when the fifth comparative rotor 25 is used. Curve Ω1 is on the coordinate indicated by the horizontal axis (rotation position) and the vertical axis TL (size of torque) on the left side, and curve Ω2 is on the coordinate indicated by the horizontal axis (rotation position) and the vertical axis TR (size of torque) on the right side.

The above reasons (features) <1> and <2> should be apparent by comparing the curves Π1 and Π2 of FIG. 18A of when the rotor 15 is used, and the curves Ω1 and Ω2 of FIG. 18B of when the fifth comparative rotor 25 is used.

The waveform Qr12 [see FIG. 14A] of the synthesized reluctance of when the rotor 15 is used has the features <1> and <2>. Thus, by synthesizing the waveform Qr12 of the synthesized reluctance torque and curve Qm1 of the magnet torque, the basic order (18th order) cancels out leaving the 36th order components, thereby significantly achieving higher order.

In a case of the waveform Qr22 [see FIG. 14A] of the synthesized reluctance torque when the fifth comparative rotor 25 is used, the cancellation extent of the basic order (18th order) component becomes small, and thus the torque ripple of curve Q2rm becomes large compared to curve Q1rm when the waveform Qr22 of the synthesized reluctance torque and curve Qm2 of the magnet torque are synthesized, due to the above features <1> and <2>.

The above reason <1> will now be explained in detail.

When the fifth comparative rotor 25 is used, the change in the air gap becomes a smooth change as shown in FIG. 15B. Since the inter-pole portion is configured with an outwardly convex arc, the reluctance torque fluctuation becomes smooth and small, and the rotating 18th order component which underlies the wavelength generally becomes small with respect to the amplitude of the component waveform of the rotating basic order (18th order) of the magnet torque waveform. When the rotor 15 including angled portions H11, H12 is used, the air gap gh1 becomes that shown in FIG. 15A due to the presence of the angled portions H11 and H12. Such change in the air gap emphasizes the 18th order component and the 36th order component of the synthesized reluctance torque.

Figure 19A:
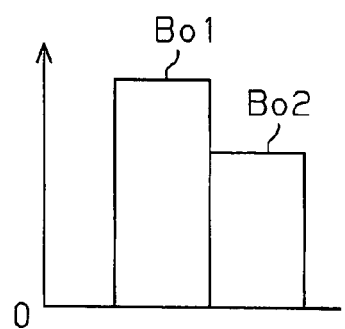
FIGS. 19A and 19B are graphs showing the difference between a torque ripple in curve Q1*rm* and a torque ripple in curve Q2*rm*.
Figure 19B:
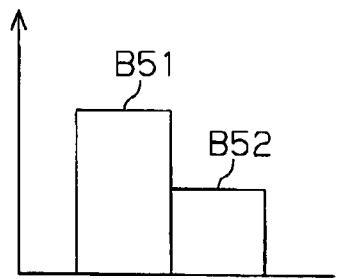

The bar graph of FIG. 19A shows the result of the Fourier series expansion of curve Qr12, and the bar graph of FIG. 19B shows the result of the Fourier series expansion of curve Qr22. Bar bo1 represents the size of the 18th order component obtained by performing Fourier series expansion on curve Qr12, and bar bo2 represents the size of the 36th order component obtained by performing Fourier series expansion on curve Qr12. Bar b51 represents the size of the 18th component obtained by performing Fourier series expansion on curve Qr22, and bar b52 represents the size of the 36th order component obtained by performing Fourier series expansion on curve Qr22. As apparent from FIG. 19A and FIG. 19B, the 18th order component in curve Qr12 is greater than the 18th order component in curve Qr22, and the 36th order component in curve Qr12 is greater than the 36th order component in curve Qr22. This result advantageously acts to have the amplitude of the component of the basic order (18th order) in the reluctance torque to be the same as the amplitude of the component of the basic order (18th order) in the magnet torque.

The above reason <2> will now be described in detail.

The phase of the waveform of the 18th order component in the reluctance torque can be adjusted by the position where the raised part Qro12 is produced. Consider the waveform Π6 in FIG. 20D and the waveform Π7 in FIG. 20E. The waveform Π6 is a model waveform generated by adding the sinusoidal wave Π3 of FIG. 20A and the waveform Π4 of FIG. 20B, and the waveform Π7 is a model waveform generated by adding the sinusoidal wave Π3 of FIG. 20A and the waveform Π5 of FIG. 20C. The waveforms Π6 and Π7 are waveforms having the raised part Qro produced at different positions with respect to the same sinusoidal wave Π3.

Figure 20A:
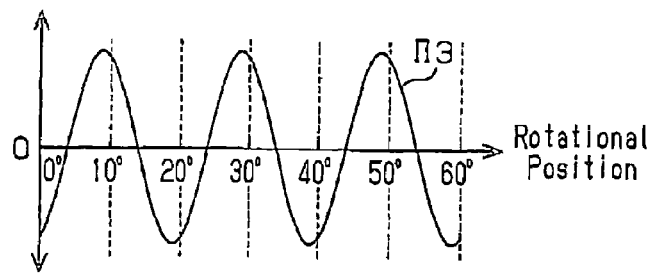
FIGS. 20A to 20*f* are graphs showing the difference between a torque ripple in curve Q1*rm* and a torque ripple in curve Q2*rm*.
Figure 20B:
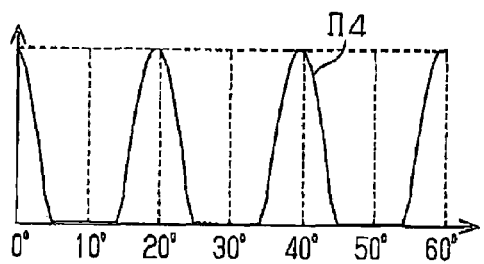
Figure 20C:
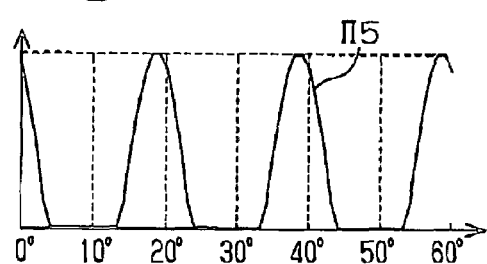
Figure 20D:
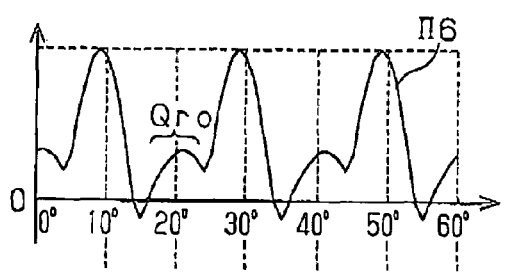
Figure 20E:
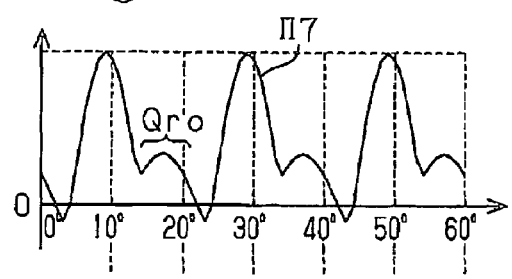
Figure 20F:
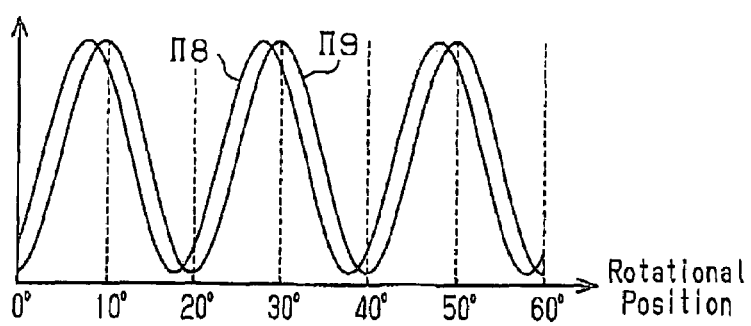

The waveform Π8 of FIG. 20F is the 18th order component waveform extracted from the waveform Π6 of FIG. 20D, and the waveform Π9 of FIG. 20F is the 18th order component waveform extracted from the waveform Π7 of FIG. 20E. As apparent from FIG. 20F, the phase of the 18th order component waveform Π8 differs from the phase of the 18th order component waveform Π9. That is, the phases of the 18th order component waveforms Π8, Π9 are adjusted by changing the position of the raised part Qro. That is, by appropriately setting the positions of the angled portions H11, H12, the 18th order component of the reluctance torque is adjusted to the antiphase of the 18th order component of the magnet torque.

Therefore, the 18th order component and the 36th order component cannot be emphasized and the phase of the 18th order component of the reluctance torque cannot be adjusted in the fifth comparative rotor 25 in which the angled portions H11, H12 are not formed. Thus, a significant higher order cannot be achieved in the fifth comparative rotor 25 compared to the rotor 15.

The first embodiment has the advantages described below.

(1) As apparent from the graph of FIG. 7A, the torque constant for the rotor 15 does not different much from the torque constant for the first comparative rotor 21 in which the outer circumference has a constant radius (=R). The torque constant for the rotor 15 is greater than the torque constant for each of the second to the fourth comparative rotors 22 to 24. That is, the lowering of torque for each of the second to the fourth comparative rotors 22 to 24 is greater than for the rotor 15, in particular, the lowering of torque for the third and the fourth comparative rotors 23, 24 is prominent.

As apparent from the graph of FIG. 7B, the torque ripple for the rotor 15 is greatly lowered compared to the torque ripple for the first comparative rotor 21 in which the outer circumference has a constant radius (=R). The torque ripple for each of the second to the fourth comparative rotor 22 to 24 is also small compared to the torque ripple for the first comparative rotor 21, but the torque ripple for the rotor 15 is small compared to the torque ripple for the second and the third comparative rotors 22, 23. The torque ripple for the fourth comparative rotor 24 has about the same size as the torque ripple for the rotor 15, but the torque for the fourth comparative rotor 24 is greatly lowered compared to the rotor 15, as apparent from the graph of FIG. 7A.

As apparent from the FEM analysis result shown in FIG. 7A and FIG. 7B, the rotor 15 excels in suppressing the size of the torque and the torque ripple than the other first to the fourth comparative rotors 21 to 24. The configuration of having a minimum gap between the teeth 121 of the stator 11 and the outer circumference of the rotor 15 across the entire circumferential portions 19A, 19B contributes to avoiding the lowering of the torque. The convex portion 20 that smoothes the magnetic flux fluctuation at the outer circumferential surface of the rotor 15 contributes to suppressing the torque ripple and also contributes to avoiding the lowering of the torque. That is, the result that the rotor 15 excels in suppressing the size of the torque and the torque ripple than the other first to the fourth comparative rotors 21 to 24 is provided by the configuration of connecting the adjacent circumferential portions 19A, 19B, which are spaced apart, with the convex portion 20.

(2) The convex portion 20 is formed by connecting three lines H1, H2, H3. As apparent from the FEM analysis result of FIG. 7B, the convex portion 20 formed by connecting the three lines H1, H2, H3 so as to form the two angled portions H11, H12 is suitable for suppressing torque ripple.

(3) As shown in FIG. 14C, the rotor 15 including the convex portion 20 with the angled portions H11, H12 and the fifth comparative rotor 25 including the arc-shaped convex portion 26 both provide higher order of the waveform of the output torque by synthesizing the magnet torque and the synthesized reluctance torque. However, the reduction effect of the torque ripple by the higher order of the output torque is higher for the rotor 15 including the convex portion 20 with angled portions H11, H12 than for the fifth comparative rotor 25 including the arc-shaped convex portion 26.

That is, when the output torque is performed with Fourier series expansion, the torque ripple at the basic order component of the output torque of the rotor 15 including the convex portion 20 formed by connecting the three lines H1, H2, H3 is smaller than that of the fifth comparative rotor 25 including the arc-shaped convex portion 26, as apparent from the graphs of FIG. 12A and FIG. 12B. That is, the convex portion 20 including the two angled portions H11, H12 contributes to smoothing the magnetic flux fluctuation at the outer circumferential surface of the rotor 15. This suppresses the torque ripple.

(4) The length of the lines H2, H3, which are located at the two sides of the three lines H1, H2, H3, is longer than the extension lines H21, H31 (see FIG. 6). Such structure causes the change in the air gap gh1 shown by curve Gh1 in FIG. 15A. The lines H2, H3 being longer than the extension lines H21, H31 is advantageous in having the output torque to a higher order to reduce the torque ripple of the basic order component of the output torque.

(5) In the structure for setting the inter-bridge angle Θb to a range of 0<Θb≦10°, the state without auxiliary magnetic pole is achieved, and the torque ripple rate ratio Rx/Ri becomes less than or equal to 1. Therefore, the value (torque ripple rate) obtained by dividing the torque ripple (size of the fluctuation width of the output torque) by the average value of the output torque becomes smaller. That is, the configuration of setting the inter-bridge angle Θb to a range of 0<Θb≦10° is preferable in providing the state without auxiliary magnetic pole and suppressing the torque ripple (size of the fluctuation width of the output torque).

(6) The analysis results of FIG. 7A and FIG. 7B is obtained on the assumption that the circumferential portions 19A, 19B are arranged at equal pitch in the circumferential direction. The configuration in which a plurality of circumferential portions 19A, 19B are arranged at equal pitch is suitable for preventing the lowering of the torque and for suppressing the torque ripple.

(7) The maximum gap between the teeth 121 and the outer circumference of the rotor 15 is a gap G corresponding to the magnetic pole switching part 164 located between two adjacent permanent magnets 17A, 17B. The structure having the gap G corresponding to the magnetic pole switching part 164 being the largest contributes to alleviating sudden fluctuation in the magnetic flux density and suppressing torque ripple.

(8) The structure using wave winding of three phases for the winding method of the stator 11 is advantageous in suppressing vibration.

(9) The inter-bridge angle Θb=5.2° is most suitable in sufficiently drawing out the reduction effect of the torque ripple rate and for ensuring the strength between the magnetic poles.

The range of the angular width A and the angular width θc in which the torque ripple rate ratio Rx/Ri becomes less than or equal to 1 will now be described with reference to FIGS. 22A to 24.

Figure 24:
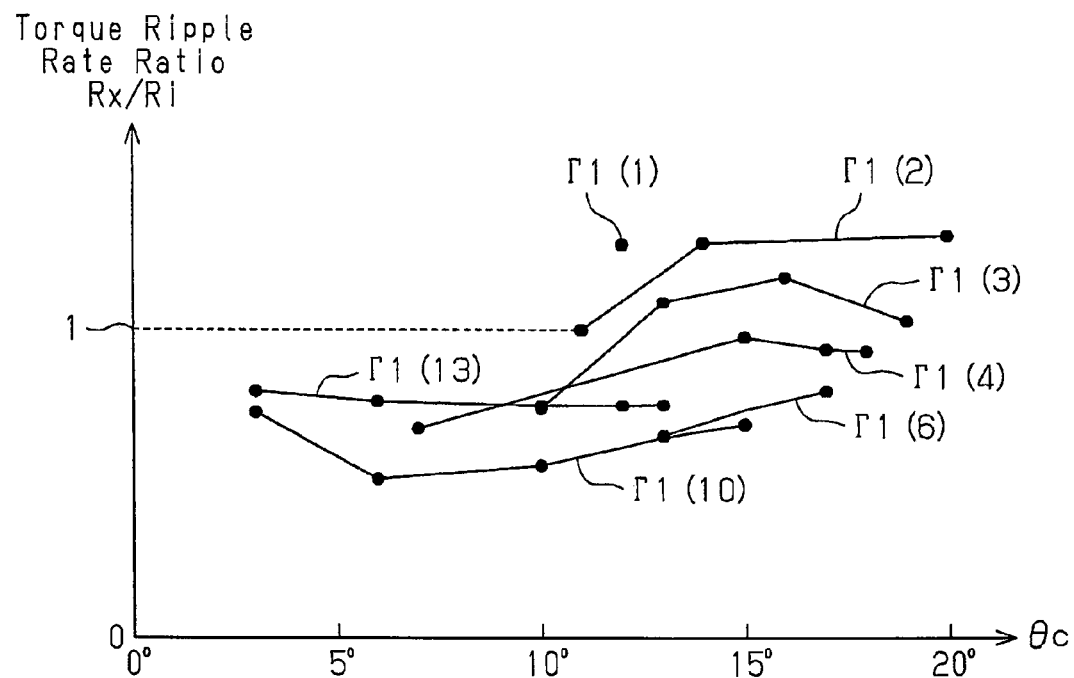
FIG. 24 is a graph showing the FEM analysis example of change in the torque ripple rate ratio Rx/Ri when the angular width θc of the rotor 15 is changed.

The graph of FIG. 24 shows the FEM analysis example of the change in the torque ripple rate ratio Rx/Ri when the angular width θc is changed using the rotor 15. The horizontal axis of the graph of FIG. 24 shows the value of the angular width θc, and the vertical axis shows the value of the torque ripple rate ratio Rx/Ri. The dots in the graph are the actual data obtained by the FEM analysis.

The actual data Γ1 (1) and the actual data group Γ1 (2), Γ1 (3), Γ1 (4), Γ1 (6), Γ1 (10) Γ1 (13) in the graph of FIG. 24 are data obtained based on the conditions of:

respectively having the angular widths A=14°, 16°, 18°, 20°, 24°, 28°, 32°;

having the above described common analysis conditions; and having the ratio Dh/R=0.028[=0.7/R=0.7 mm/25.5 mm] of the depth Dh=0.7 mm with respect to the radius R.

The graph of FIG. 23A is an explanatory view prepared for determining an appropriate range of the angular width A and the angular width θc based on the graph of FIG. 24. The horizontal axis in FIG. 23A shows the angular width A and the vertical axis shows the angular width θc. The actual data group shown with the dots in FIG. 23A indicate only the actual data in which the torque ripple rate ratio Rx/Ri becomes less than or equal to 1 out of the actual data Γ1 (1) and the actual data group Γ1 (2), Γ1 (3), Γ1 (4), Γ1 (6), Γ1 (10) Γ1 (13). Line J4 represents the maximum value Amax (4) of the angular width A specified by Dh/R=0.028[=0.7/R] serving as the ratio of the depth Dh with respect to the radius R and the line H (plane H). The maximum value Amax (4) represents the upper limit of the angular width A, where the convex portion 20 can be formed with the angular width A smaller than the maximum value and the ratio Dh/R=0.028[=0.7/R], but the convex portion 20 cannot be formed with the angular width A of the size greater than or equal to the maximum value and the ratio Dh/R=0.028[=0.7/R].

Line α represents the upper limit of the angular width θc specified by the angular width A. That is, the line α represents the upper limit of the angular width θc in which the convex portion 20 cannot be formed with the angular width θc in the region on the upper side including the line α. The line α is hereinafter referred to as the upper limit line α. The upper limit line α is expressed by the following equation (3).

$$\theta c = (60 - A)°/2 \quad (3)$$

The graphs in FIG. 22A to FIG. 22C and FIG. 23B to FIG. 23C are explanatory views prepared for determining the appropriate range of the angular width A and the angular width θc based on the data (data corresponding to the graph of FIG. 24 and data that is not shown but has been checked) obtained through the FEM analysis of the change in the torque ripple rate ratio Rx/Ri of when the angular width θc is changed. The graph of FIG. 22A corresponds to when the depth is Dh=0.1 mm, and the graph of FIG. 22B corresponds to when the depth is Dh=0.3 mm. The graph of FIG. 23B corresponds to when the depth is Dh=1.0 mm, and the graph of FIG. 22C corresponds to when the depth is Dh=1.2 mm. The radius R is 25.5 mm in each case.

Figure 22A:
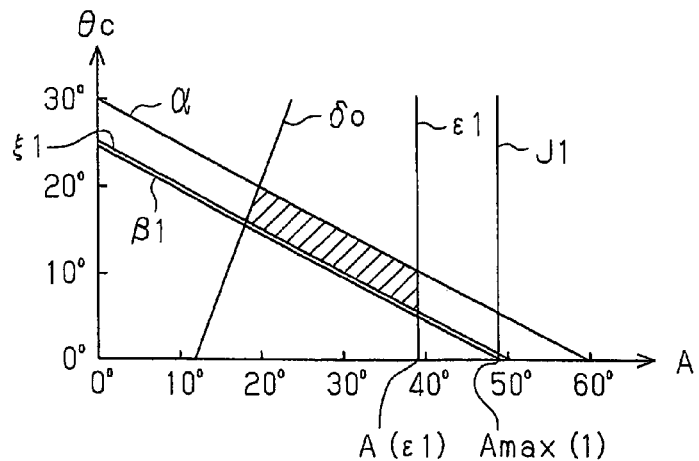
FIG. 22A to FIG. 22C are graphs showing the determination of an appropriate range for an angular width A and an angular width θc having a torque ripple rate ratio Rx/Ri of less than or equal to 1.
Figure 22B:
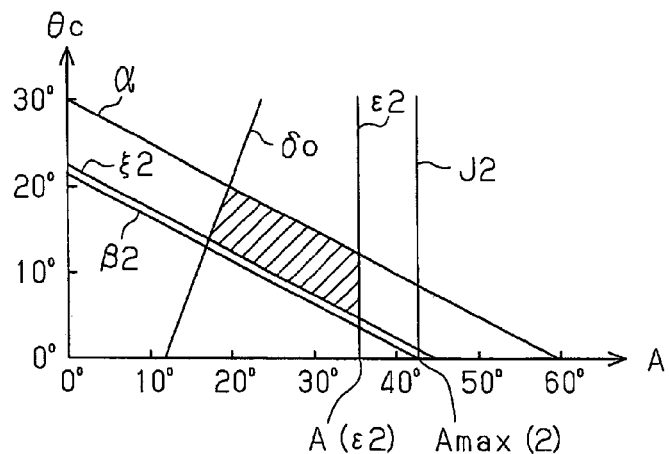
Figure 22C:
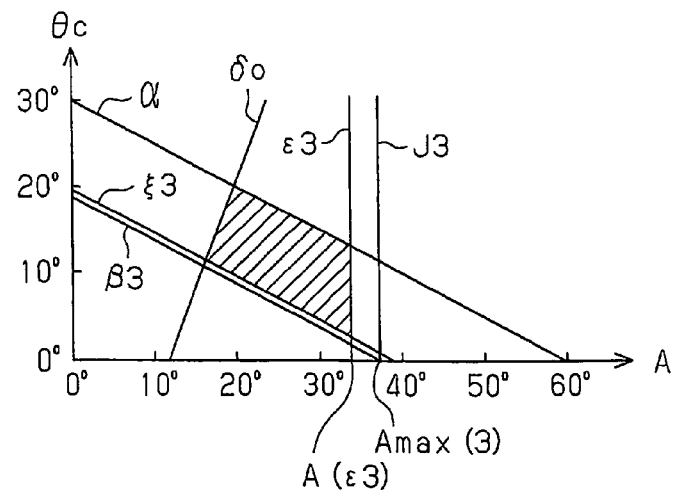

Line J1 in FIG. 22A represents the maximum value Amax (1) of the angular width A specified by the ratio Dh/R=0.004 [=0.1/R] of the depth Dh with respect to the radius R and the line H (plane H). Line J2 in FIG. 22B represents the maximum value Amax (2) of the angular width A specified by the ratio Dh/R=0.012[=0.3/R] of the depth Dh with respect to the radius R and the line H (plane H). Line J3 in FIG. 22C represents the maximum value Amax (3) of the angular width A specified by the ratio Dh/R=0.02[=0.5/R] of the depth Dh with respect to the radius R and the line H (plane H).

The maximum value Amax (1) in FIG. 22A represents the upper limit of the angular width A, where the convex portion 20 can be formed with the angular width A smaller than the maximum value and the ratio Dh/R=0.004[=0.1/R], but the convex portion 20 cannot be formed with the angular width A having a size greater than or equal to the maximum value and the ratio Dh/R=0.004[=0.1/R]. The maximum value Amax (2) in FIG. 22B represents the upper limit of the angular width A, where the convex portion 20 can be formed with the angular width A smaller than the maximum value and the ratio Dh/R=0.006[=0.3/R], but the convex portion 20 cannot be formed with the angular width A having a size greater than or equal to the angular width and the ratio Dh/R=0:012[=0.3/R]. The maximum value Amax (3) in FIG. 22C represents the upper limit of the angular width A, where the convex portion 20 can be formed with the angular width A smaller than the maximum value and the ratio Dh/R=0.02[=0.5/R], but the convex portion 20 cannot be formed with the angular width A having a size greater than or equal to the maximum value and the ratio Dh/R=0.02[=0.5/R].

The maximum value Amax (4) in FIG. 23A represents the upper limit of the angular width A, where the convex portion 20 can be formed with the angular width A smaller than the maximum value and the ratio Dh/R=0.028[=0.7/R], but the convex portion 20 cannot be formed with the angular width A having a size of greater than or equal to the maximum value and the ratio Dh/R=0.028[=0.7/R]. The maximum value Amax (5) in FIG. 23B represents the upper limit of the angular width A, where the convex portion 20 can be formed with the angular width A smaller than the maximum value and the ratio Dh/R=0.039[=1/R], but the convex portion 20 cannot be formed with the angular width A having a size greater than or equal to the maximum value and the ratio Dh/R=0.039[=1/R]. The maximum value Amax (6) in FIG. 23C represents the upper limit of the angular width A, where the convex portion 20 can be formed with the angular width A smaller than the maximum value and the ratio Dh/R=0.047[=1.2/R], but the convex portion 20 cannot be formed with the angular width A having a size greater than or equal to the maximum value and the ratio Dh/R=0.047[=1.2/R].

Collectively referring to the maximum values Amax(1), Amax(2), Amax(3), Amax(4), Amax(5), Amax(6) as the maximum value Amax, the maximum value Amax is expressed by the following equation (4).

$$A\text{max}=[60-2\times\arccos(1-Dh/R)]° \quad (4)$$

The maximum value Amax represents the maximum value Amax(1) when the ratio is Dh/R=0.004[=0.1/R] and represents the maximum value Amax(2) when the ratio is Dh/R=0.012[=0.3/R]. The maximum value Amax represents the maximum value Amax(3) when the ratio is Dh/R=0.02 [=0.5/R] and represents the maximum value Amax(4) when the ratio is Dh/R=0.028[=0.7/R]. The maximum value Amax represents the maximum value Amax(5) when the ratio is Dh/R=0.039[=1/R] and represents the maximum value Amax (6) when the ratio is Dh/R=0.047[=1.2/R].

Line β1 in FIG. 22A represents the lower limit of the angular width θc specified by the ratio Dh/R=0.004[=0.1/R] of the depth Dh with respect to the radius R and the angular width A. That is, the line β1 represents the lower limit of the angular width θc in which the convex portion 20 cannot be formed by the angular width θc in the region on the lower side including the line β1. The line ξ1 shown in FIG. 22A is on the upper side of the line β1.

Line β2 in FIG. 22B represents the lower limit of the angular width θc specified by the ratio Dh/R=0.0126[=0.3/R] of the depth Dh with respect to the radius R and the angular width A. That is, the line β2 represents the lower limit of the angular width θc, where the convex portion 20 cannot be formed by the angular width θc in the region on the lower side including the line β2. The line ξ2 shown in FIG. 22B is on the upper side of the line β2.

Line β3 in FIG. 22C represents the lower limit of the angular width θc specified by the ratio Dh/R=0.02[=0.5/R] of the depth Dh with respect to the radius R and the angular width A. That is, the line β3 represents the lower limit of the angular width θc, where the convex portion 20 cannot be formed by the angular width θc in the region on the lower side including the line β3. The line ξ3 shown in FIG. 22C is on the upper side of the line β3.

Line β4 in FIG. 23A represents the lower limit of the angular width θc specified by the ratio Dh/R=0.028[=0.7/R] of the depth Dh with respect to the radius R and the angular width A. That is, the line β4 represents the lower limit of the angular width θc, where the convex portion 20 cannot be formed by the angular width θc in the region on the lower side including the line β4. The line ξ4 shown in FIG. 23A is on the upper side of the line β4.

Line β5 in FIG. 23B represents the lower limit of the angular width θc specified by the ratio Dh/R=0.039[=1/R] of the depth Dh with respect to the radius R and the angular width A. That is, the line β5 represents the lower limit of the angular width θc, where the convex portion 20 cannot be formed by the angular width θc in the region on the lower side including the line β5. The line ξ5 shown in FIG. 23B is on the lower side of the line β5.

Line β6 in FIG. 23C represents the lower limit of the angular width θc specified by the ratio Dh/R=0.047[=1.2/R] of the depth Dh with respect to the radius R and the angular width A. That is, the line β6 represents the lower limit of the angular width θc, where the convex portion 20 cannot be formed by the angular width θc in the region on the lower side including the line β6. The line ξ6 shown in FIG. 23C is on the lower side of the line β6.

The lines β1, β2, β3, β4, β5, β6 are referred to as lower limit lines β1, β2, β3, β4, β5, β6. The lower limit lines β1, β2, β3, β4, β5, β6 are expressed by the following equation (5).

$$\theta c=[60-A-2\times\arccos(1-Dh/R)]°/2 \quad (5)$$

Here, arc cos (1−Dh/R) expresses the angle σ as a cos σ that results in a value of (1−Dh/R). Equation (5) expresses the lower limit β1 when the ratio is Dh/R=0.004[=0.1/R], expresses the lower limit β2 when the ratio is Dh/R=0.012 [=0.3/R], and expresses the lower limit β3 when the ratio is Dh/R=0.02[=0.5/R]. Equation (5) expresses the lower limit β4 when the ratio is Dh/R=0.028[=0.7/R], expresses the lower limit β5 when the ratio is Dh/R=0.039[=1/R], and expresses the lower limit β6 when the ratio is Dh/R=0.047 [=1.2/R].

The lines ξ1, ξ2, ξ3, ξ4, ξ5, ξ6 are expressed by the following equation (6).

$$\theta c=[-0.5\times A+(-14.1\times Dh+26.7)]° \quad (6)$$

Equation (6) expresses the lower limit ξ1 when the ratio is Dh/R=0.004[=0.1/R], expresses the lower limit ξ2 when the ratio is Dh/R=0.012[=0.3/R], and expresses the lower limit ξ3 when the ratio is Dh/R=0.02[=0.5/R]. Equation (6) expresses the lower limit ξ4 when the ratio is Dh/R=0.028[=0.7/R], expresses the lower limit ξ5 when the ratio is Dh/R=0.039 [=1/R], and expresses the lower limit ξ6 when the ratio is Dh/R=0.047[=1.2/R].

In FIG. 22A, the torque rate ratio Rx/Ri becomes less than or equal to 1 by limiting the angular width A of when the ratio is Dh/R=0.004[=0.1/R] to between the line δo and the line ε1 (region on the right side from the line δo and on the left side from the line ε1), and limiting the angular width θc to between the upper limit line α and the lower limit line β1 (region on the lower side from the upper limit line α and on the upper side from the lower limit line β1), as shown by the shaded region.

In FIG. 22B, the torque rate ratio Rx/Ri becomes less than or equal to 1 by limiting the angular width A of when the ratio is Dh/R=0.012[=0.3/R] to between the line δo and the line ε2 (region on the right side from the line δo and on the left side from the line ε2), and limiting the angular width θc to between the upper limit line α and the lower limit line β2 (region on the lower side from the upper limit line α and on the upper side from the lower limit line β2), as shown by the shaded region.

In FIG. 22C, the torque rate ratio Rx/Ri becomes less than or equal to 1 by limiting the angular width A of when the ratio is Dh/R=0.02[=0.5/R] to between the line δo and the line ε3 (region on the right side from the line δo and on the left side from the line ε3), and limiting the angular width θc to between the upper limit line α and the lower limit line β3 (region on the lower side from the upper limit line α and on the upper side from the lower limit line β3), as shown by the shaded region.

In FIG. 23A including line z1, the torque ripple rate ratio Rx/Ri becomes less than or equal to 1 by limiting the angular width A of when the ratio is Dh/R=0.028[=0.7/R] to between the line δo and the line ε4 (region on the right side from the line δo and on the left side from the line ε4) and limiting the angular width θc to between the upper limit line α and the lower limit line β4 (region on the lower side from the upper limit line α and on the upper side from the lower limit line β4), as shown by the shaded region. The line zo is expressed by the following equation (7-1), and the line δo is expressed by the following equation (7-2).

$$\theta c = 10° \quad (7\text{-}1)$$

$$\theta c = (2.5 \times A - 30)° \quad (7\text{-}2)$$

In FIG. 23B including lines zo, z1, the torque ripple rate ratio Rx/Ri becomes less than or equal to 1 by limiting the angular width A of when the ratio is Dh/R=0.039[=1/R] to between the line δo and the line J5 (region on the right side from the line δo and on the left side from the line J5), and limiting the angular width θc to between the upper limit line α and the line ξ5 (region on the lower side from the upper limit line α and on the upper side including the line ξ5), as shown by the shaded region. The line zo is expressed by the equation (7-1), and the line δo is expressed by the equation (7-2). The line z1 is expressed by the following equation (8).

$$\theta c = (-0.5 \times A + 16)° \quad (8)$$

In FIG. 23C including lines zo, z1, the torque ripple rate ratio Rx/Ri becomes less than or equal to 1 by limiting the angular width A of when the ratio is Dh/R=0.047[=1.2/R] to between the line δo and the line J6 (region on the right side from the line δo and on the left side from the line J6), and limiting the angular width θc to between the upper limit line α and the line ξ6 (region on the lower side from the upper limit line α and on the upper side including the line ξ6), as shown by the shaded region.

In FIGS. 22A to 22C and FIG. 23A, collectively referring to the angles A(ε1), A(ε2); A(ε3), A(ε4) expressed by lines ε1, ε2, ε3, ε4 as A(ε), the angle A(ε) is expressed by the following equation (9).

$$A(\varepsilon) = [60 - 2 \times \arccos(1 - Dh/R) - \quad (9)$$
$$(-18.9 \times Dh + 12.7)]°$$
$$= [A\max - (-18.9 \times Dh + 12.7)]°$$

The angle A(ε) represents the angle A(ε1) when the ratio is Dh/R=0.004[=0.1/R], the angle A(ε2) when the ratio is Dh/R=0.012[=0.3/R], the angle A(ε3) when the ratio is Dh/R=0.02[=0.5/R], and the angle A(ε4) when the ratio is Dh/R=0.028[=0.7/R].

When the angle A(ε) represents the angle A(ε1), (−18.9× Dh+12.7) becomes a negative value, and thus the value of Amax−(−18.9×Dh+12.7) becomes greater than Amax. The angular width A is considered to be less than Amax if the value of Amax−(−18.9×Dh+12.7) becomes greater than or equal to Amax. That is, if the value of Amax−(−18.9×Dh+ 12.7) becomes greater than or equal to Amax, the equation (9) is substituted by equation (9-1).

$$A(\varepsilon) = A\max \quad (9\text{-}1)$$

The torque rate ratio Rx/Ri becomes less than or equal to 1 if the angular width satisfies equation (10), and the angular width θc satisfies equation (11).

$$A \leq [60 - 2 \times \arccos(1 - Dh/R) - \quad (10)$$
$$(-18.9 \times Dh + 12.7)]° = [A\max - (18.9 \times Dh + 12.7)]°$$
and
$$A < [60 - 2 \times \arccos(1 - Dh/R)]° = A\max$$

$$[60 - A - 2 \times \arccos(1 - Dh/R]°/2 = \quad (11)$$
$$(A\max - A)°/2 < \theta c < (60 - A)°/2$$

Considering all the equations (3) to (6), (7-1), (7-2), (8), (9), (9-1), (10), (11), the torque ripple rate ratio Rx/Ri can be made less than or equal to 1 by setting the angular width A in a range expressed by the following equation (1-0), and setting the angular width θc in the range expressed by the following equation (2-0).

Condition (1-0):

$$A \leq [60 - 2 \times \arccos(1 - Dh/R) - (-18.9 \times Dh + 12.7)]°$$

and $$A < [60 - 2 \times \arccos(1 - Dh/R)]°$$

Condition (2-0):

When the angular width A is in the range expressed by equation (1-0), one of the following equations (i) to (iii) is satisfied, and all of equations (iv) to (vi) are satisfied.

$$\theta c \leq 10° \quad (i)$$

$$\theta c \leq (-0.5 \times A + 16)° \quad (ii)$$

$$\theta c \leq (2.5 \times A - 30)° \quad (iii)$$

$$[60 - A - 2 \times \arccos(1 - Dh/R)]°/2 < \theta c \quad (iv)$$

$$[-0.5 \times A + (-14.1 \times Dh + 26.7)]° \leq \theta c \quad (v)$$

$$\theta c < (60 - A)°/2 \quad (vi)$$

Equations (1-0), (2-0) correspond to when R=25.5 mm and the number of poles is P=6, but equations (1-0), (2-0) can be extended to equations (1), (2), (ex1), (ex2) by having Dhr=Dh×25.5/R even when the radius R is not 25.5 mm or when the number of poles p is not 6.

Condition (1):

$$Ao \leq [60 - 2 \times \arccos(1 - Dhr/25.5) - (-18.9 \times Dhr + 12.7)]°$$

and $$Ao < [60 - 2 \times \arccos(1 - Dhr/25.5)]°$$

Condition (2):

When the angular width A is in the range expressed by equation (1), one of the following equations (i) to (iii) is satisfied, and all of the equations (iv) to (vi) are satisfied.

$$\theta c \leq 10° \quad (i)$$

$$\theta c \leq (-0.5 \times A + 16)° \quad (ii)$$

$$\theta c \leq (2.5 \times A - 30)° \quad (iii)$$

$$[60 - A - 2 \times \arccos(1 - Dh/R)]°/2 < \theta c \quad (iv)$$

$$[-0.5 \times A + (-14.1 \times Dh + 26.7)]° \leq \theta c \quad (v)$$

$$\theta c < (60 - A)°/2 \quad (vi)$$

$$A = Ao \times 6/p \quad (ex1):$$

$$\theta c = \theta co \times 6/p \quad (ex2):$$

Equations (ex1), (ex2) are conversion equations for setting the angular width A and the angular width θc with respect to the range of the angular width Ao and θco set in equations (1) and (2) when p≠6. That is, for cases other than p=6, Ao and θco in equations (1), (2) are substituted by A×6/p and θc×6/p of equations (ex1) (ex2). That is, conversion of equations (ex1), (ex2) is performed and A, θc are used as the set angular width.

The range of the angular width A and the angular width θc of when the basic order (18th order) component becomes less than or equal to 0.7 times compared to the case of the first comparative rotor 21 in a range of FIGS. 22A to 24 will now be described with reference to FIGS. 25 to 27. In FIGS. 26 and 27, the same reference characters are denoted for the lines that are the same as those in FIGS. 22 and 23.

Figure 25:
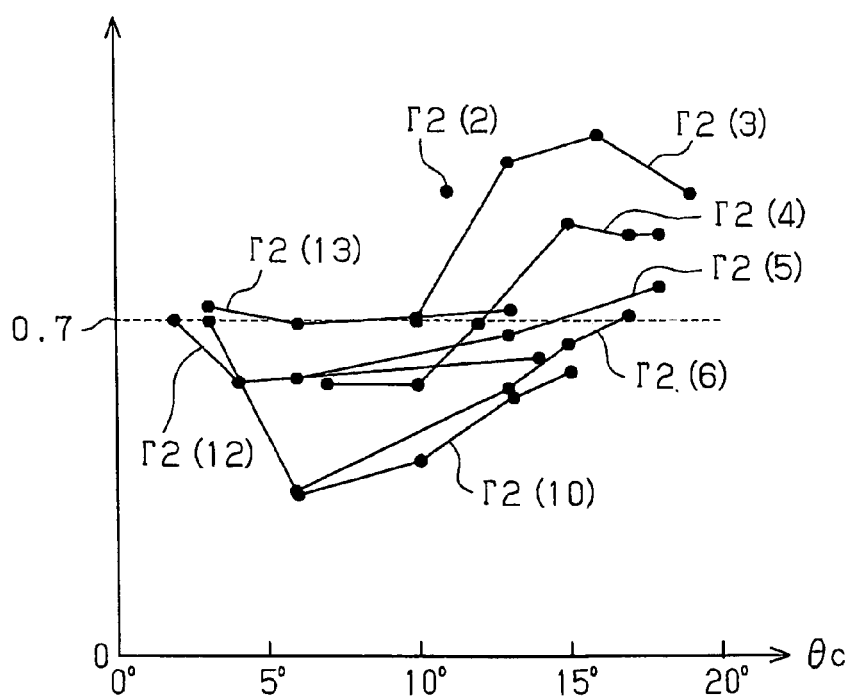
FIG. 25 is a graph showing the FEM analysis example of change in the torque ripple rate ratio Rx/Ri when the angular width θc of the rotor 15 is changed.

The graph of FIG. 25 shows the FEM analysis example of the change in the torque ripple rate ration Rx/Ri of when the angular width θc is changed using the rotor 15. The dots in the graph are the actual data obtained through the FEM analysis.

The actual data Γ2 (2) and the actual data group Γ2(3), Γ2(4), Γ2(5), Γ2(6), Γ2(10), Γ2(12), Γ2(13) in the graph of FIG. 25 are data obtained based on the conditions of:

Respectively having the angular width A=16°, 18°, 20°, 22°, 24°, 28°, 30°, 32°;

having the above described common analysis conditions; and having the ratio Dh/R=0.028[=0.7/R=0.7 mm/25.5 mm] of the depth Dh=0.7 mm with respect to the radius R.

Figure 27A:
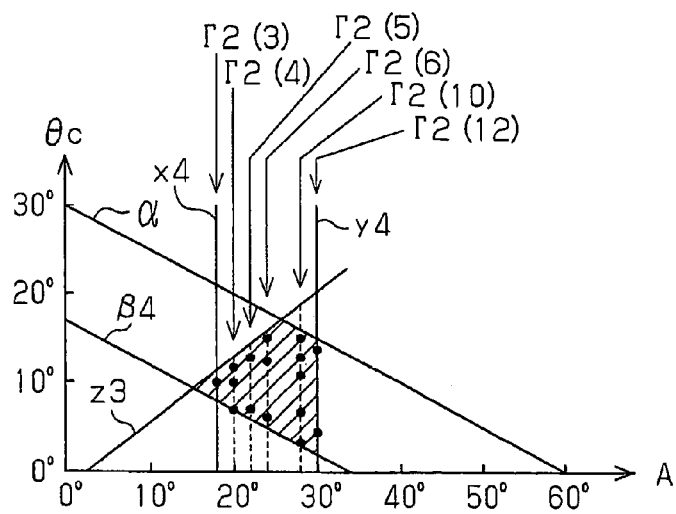
FIG. 27A to FIG. 27C are graphs showing the determination of the appropriate range for the angular width A and the angular width θc having an 18th order component to less than or equal to 0.7.

The graph of FIG. 27A is an explanatory view prepared for determining an appropriate range of the angular width A and the angular width θc based on the graph of FIG. 25. The actual data group shown with the dots in FIG. 27A indicate only the actual data in which the basic order (18th order) component becomes less than or equal to 0.7 times compared to the case of the first comparative rotor 21 out of the actual data 12 (2) and the actual data group Γ2 (3), Γ2 (4), Γ2 (5), Γ2 (6), Γ2 (10) Γ2 (12), Γ2 (13) The lines x4, y4, z2 are lines set to limit the basic order (18th order) component to less than or equal to 0.7 times that of the first comparative rotor 21.

The graphs in FIGS. 26A to 26C, 27B, and 27C are explanatory views prepared for determining the appropriate range of the angular width A and the angular width θc based on the data (data corresponding to the graph of FIG. 25, data that is not shown but that has been checked) obtained through the FEM analysis of the change in the torque ripple rate ratio Rx/Ri of when the angular width θc is changed. The graph of FIG. 26A corresponds to the depth of Dh=0.1 mm, and the graph of FIG. 26B corresponds to the depth of Dh=0.3 mm. The graph of FIG. 26C corresponds to the depth of Dh=0.5 mm. The graph of FIG. 27B corresponds to the depth of Dh=1.0 mm, and the graph of FIG. 27C corresponds to the depth of Dh=1.2 mm. The radius R is 25.5 mm in each case.

Figure 26A:
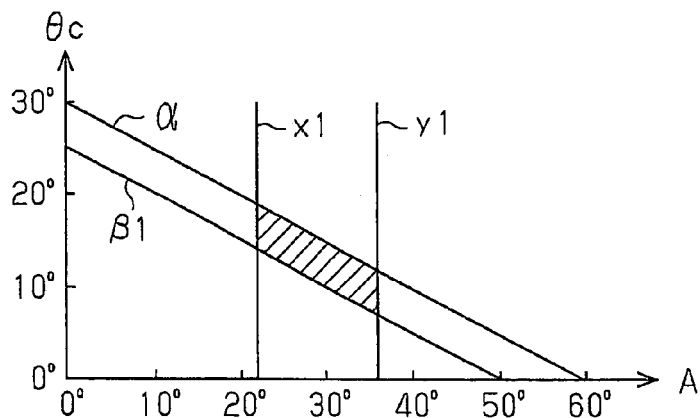
FIG. 26A to FIG. 26C are graphs showing the determination of an appropriate range for the angular width A and the angular width θc having an 18th order component of less than or equal to 0.7.
Figure 26B:
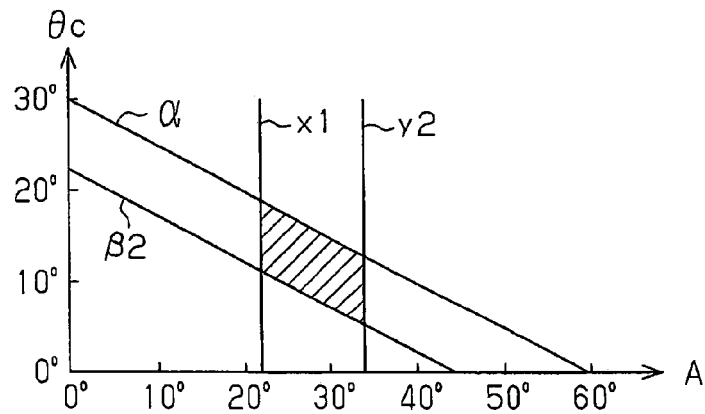
Figure 26C:
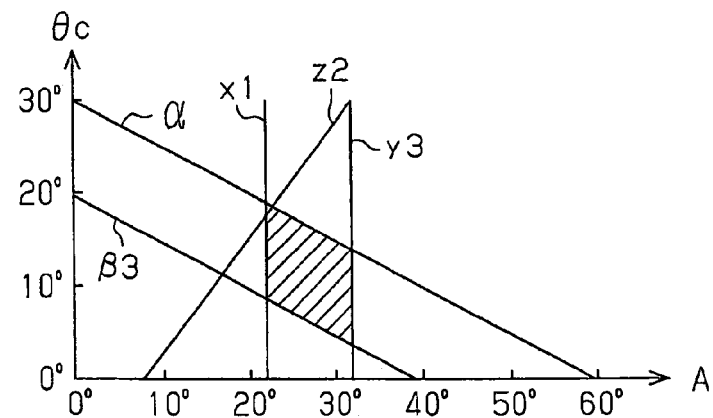
Figure 27B:
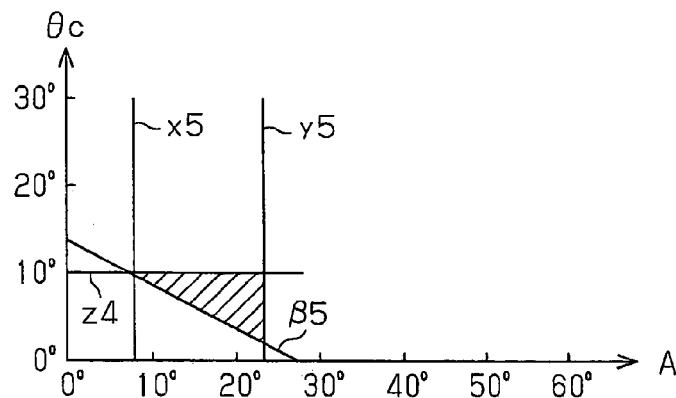
Figure 27C:
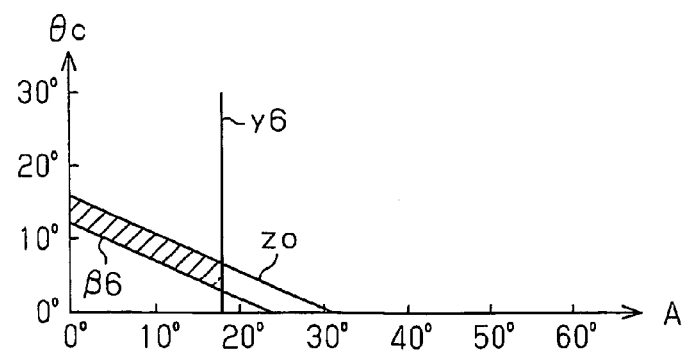

The lines x1, y1 shown in FIG. 26A, the lines x1, y2 shown in FIG. 26B, the lines x1, y3 shown in FIG. 26C, the lines x5, y5 shown in FIG. 27B, and the line y6 shown in FIG. 27C are lines set to limit the basic order (18th order) component to less than or equal to 0.7 times of that of the first comparative rotor 21. The shaded region in FIG. 26A to FIG. 26C and FIG. 27A to FIG. 27C is the region where the basic order (18th order) component becomes less than or equal to 0.7 times that of the first comparative rotor 21.

The line x1 is expressed by the following equation (13).

$$A=22° \text{(when } Dh \leq 0.5) \tag{12}$$

The line x4 is expressed by the following equation (12).

$$A=(-21.4 \times Dh+32.8)° \text{(when } 0.5<Dh \leq 0.8) \tag{13}$$

The line x5 is expressed by the following equation (14).

$$A=(-38.75 \times Dh+46.5)° \text{(when } 0.8<Dh) \tag{14}$$

The lines y1, y2, y3, y4 are expressed by the following equation (15).

$$A=(-10 \times Dh+37)° \text{(when } Dh \leq 0.8) \tag{15}$$

The lines y5, y6 are expressed by the following equation (16).

$$A=(-27.5 \times Dh+51)° \text{(when } 0.8<Dh) \tag{16}$$

The lines z2, z3, z4 are expressed by the following equation (17).

$$\theta c=[(-2.5 \times Dh+2.5) \times (A-16)+10]° \tag{17}$$

Considering all the equations (12) to (17), the basic order (18th order) component can be made to less than or equal to 0.7 times that of the first comparative rotor 21 by setting the angular width A in the range expressed by the following equation (1-1-0) and setting the angular width θc in the range expressed by the following equation (2-1-0).

Condition (1-1-0):
For the range of Dh≦1.2 mm, $$22° \leq A \leq (-10 \times Dh+37)° \text{(when } Dh \leq 0.5)$$

$$(-21.4 \times Dh+32.8)° \leq A \leq (-10 \times Dh+37)° \text{(when } 0.5<Dh \leq 0.8)$$

$$(-38.75 \times Dh+46.5)° \leq A \leq (-27.5 \times Dh+51)° \text{(when } 0.8<Dh)$$

Condition (2-1-0):
The equation (2-0) is satisfied and the following equation (vii) is satisfied.

$$\theta c \leq [(-2.5 \times Dh+2.5) \times (A-16)+10]° \tag{vii}$$

Equations (1-1-0), (2-1-0) correspond to when R=25.5 mm and the number of poles is p=6, but equations (1-1-0), (2-1-0) can be extended to equations (1-1), (2-1), (ex1), (ex2) by having Dhr=Dh×25.5/R even when the radius R is not 25.5 mm or when the number of poles p is not 6.

Condition (1-1):
For the range of Dhr≦1.2 mm, $$22° \leq Ao \leq (-10 \times Dhr+37)° \text{(when } Dhr \leq 0.5)$$

$$(-21.4 \times Dhr+32.8)° \leq Ao \leq (-10 \times Dhr+37)° \text{(when } 0.5<Dhr \leq 0.8)$$

$$(-38.75 \times Dhr+46.5)° \leq Ao \leq (-27.5 \times Dhr+51)° \text{(when } 0.8<Dhr)$$

Condition (2-1):
The equation (2) is satisfied and the following equation (vii) is satisfied.

$$\theta co \leq [(-2.5 \times Dhr+2.5) \times (Ao-16°)+10]° \tag{vii}$$

Equations (ex1), (ex2) are conversion equations for setting the angular width A and the angular width θc with respect to the range of the angular width Ao and θco set in equations (1-1) and (2-1) when p≠6. That is, for cases other than p=6, Ao and θco in equations (1-1-0), (2-1-0) are substituted by A×6/p and θc×6/p of equations (ex1) (ex2). The, conversion of equations (ex1), (ex2) is performed and A, θc are used as the set angular width.

The size of the basic order (e.g., 18th order for 6 poles 18 slots) component in the torque ripple of the output torque will now be described with reference to FIGS. 28 and 29, with respect to the range of the angular width A and the angular width θc in which it becomes less than or equal to the order (36th order for 6 poles 18 slots) component twice the basic order. The same reference characters are denoted in FIG. 28 for lines that are the same as those in FIGS. 26 and 27.

Figure 29:
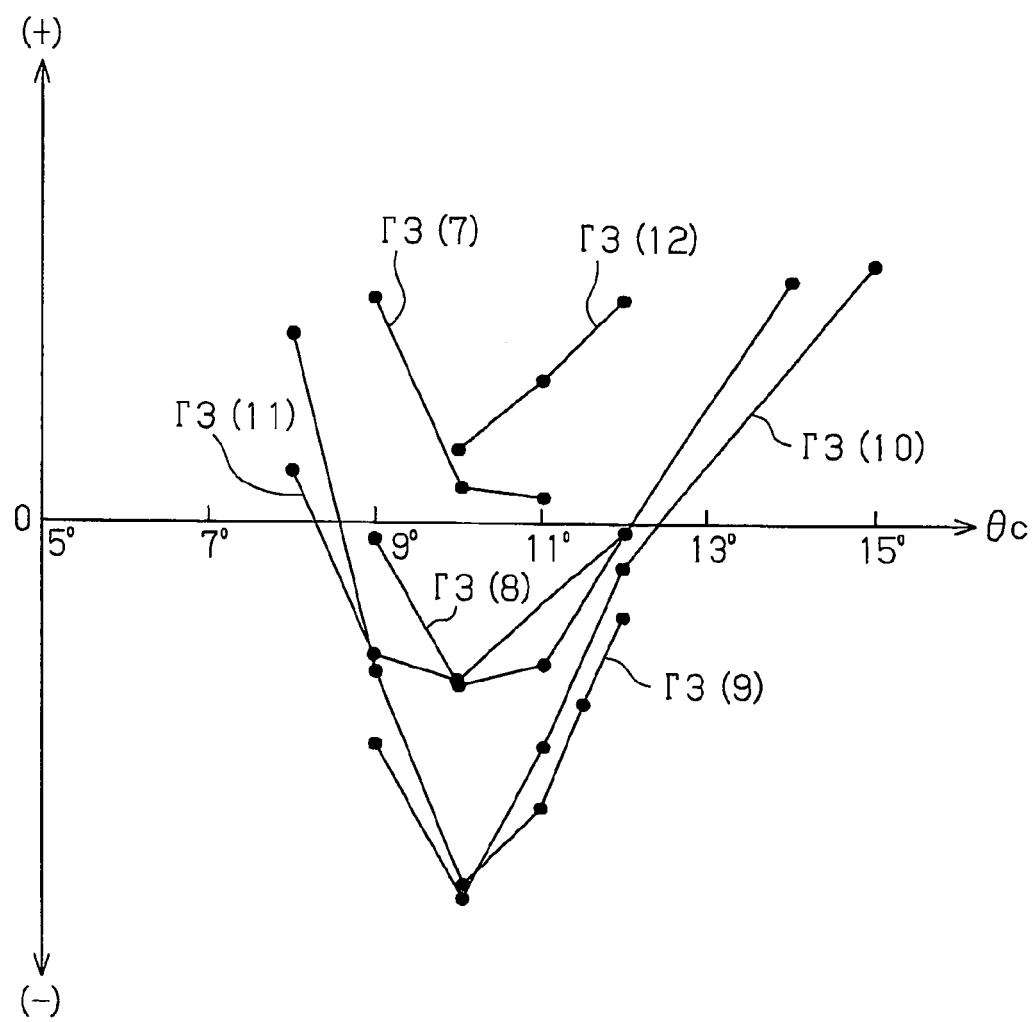
FIG. 29 shows a graph of the FEM analysis example of change in the difference between the torque ripple rate ratio Rx/Ri in the 18th order component of the torque ripple and the torque ripple rate ratio Rx/Ri in the 36th order component of the torque ripple when the angular width θc of the rotor 15 is changed.

The graph of FIG. 29 shows the FEM analysis example of the change in the difference between the torque rate ratio Rx/Ti in the 18th order component of the torque ripple and the torque ripple rate ratio Rx/Ri in the 36th order component of the torque ripple of when the angular width θc is changed using the rotor 15. The dots in the graph are actual data obtained through the FEM analysis.

The actual data Γ3 (3) and the actual data group Γ3(7), Γ3(8), Γ3(9), Γ3(10), Γ3(11) Γ3(12) in the graph of FIG. 29 are data obtained based on the conditions of:

respectively having the angular width A=25°, 26°, 27°, 2.8°, 29°, 30°;

having the above described common analysis conditions; and having the ratio Dh/R=0.02[=0.5/R=0.5 mm/25.5 mm] of the depth Dh=0.5 mm with respect to the radius R.

Figure 28A:
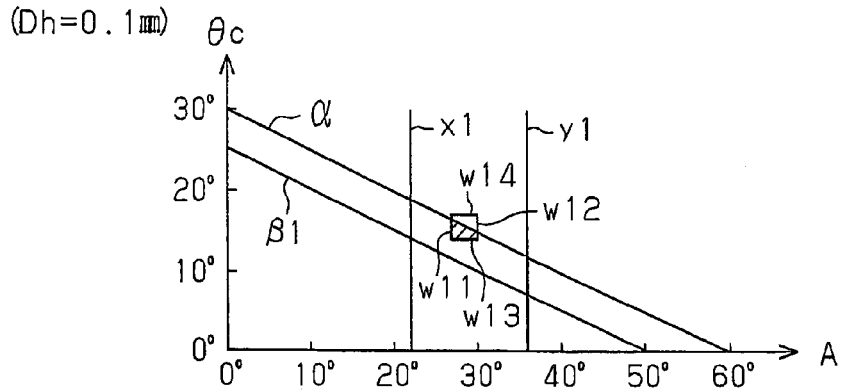
FIG. 28A to FIG. 28C are graphs showing the determination of an appropriate range for the angular width A and the angular width θc having a size for the basic order component (18th order component) in the torque ripple of less than or equal to the size of the 36th order component.
Figure 28B:
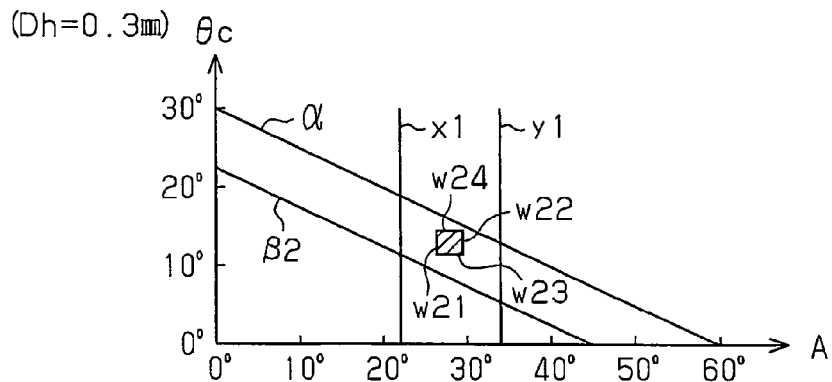
Figure 28C:
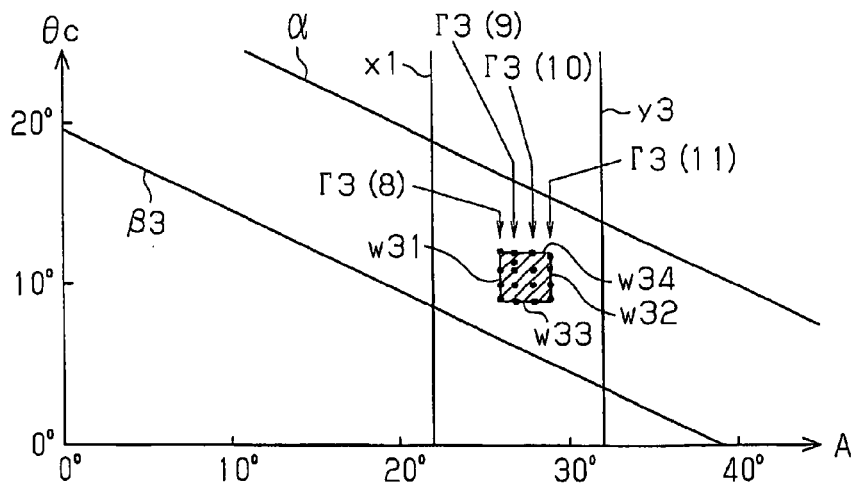

The graph of FIG. 28C is an explanatory view prepared for determining the appropriate range of the angular width A and the angular width θc based on the graph of FIG. 29. The actual data group shown with dots in FIG. 28C indicate only the actual data in which the torque ripple rate ratio Rx/Ri in the 18th order component of the torque ripple becomes less than or equal to the torque ripple rate ratio Rx/Ri in the 36th order component of the torque ripple out of the actual data group Γ3(7), Γ3(8), Γ3(9), Γ3(10), Γ3(11) Γ3(12). The lines w31, w32, w33, w34 are lines set to limit the size of the basic order component (18th order component) in the torque ripple of the output torque to less than or equal to the size of the 36th order component.

The graphs in FIG. 28A and FIG. 28B are explanatory views prepared for determining the appropriate range of the angular width A and the angular width θc based on the data (data corresponding to the graph of FIG. 29, data that is not shown but that has been checked) obtained through the FEM analysis of the change in the difference between the torque ripple rate ratio Rx/Ri in the 18th order component of the torque ripple and the torque rippled rate ratio Rx/Ri in the 36th order component of the torque ripple. The graph of FIG. 28A corresponds to the depth of Dh=0.1 mm, and the graph of FIG. 28B corresponds to the depth of Dh=0.3 mm. The radius R is 25.5 mm in either case.

The lines w11, w12, w13, w14 are lines set to limit the size of the basic order component (18th order component) in the torque ripple of the output torque to less than or equal to the size of the 36th order component. The lines w21, w22, w23, w24 are lines set to limit the size of the basic order component (18th order component) in the torque ripple of the output torque to less than or equal to the size of the 36th order component. The shaded region in FIG. 28A to FIG. 28C is the region where the size of the 18th order component in the torque ripple of the output torque becomes less than or equal to the size of the 36th order component.

The lines w11, w21, w31 are expressed by the following equation (18).

$$A=(-2.5 \times Dh+27.25)° \quad (18)$$

The lines w12, w22, w32 are expressed by the following equation (19).

$$A=(-2.5 \times Dh+30.25)° \quad (19)$$

The lines w13, w23, w33 are expressed by the following equation (20).

$$θc=(-12.5 \times Dh+18.25)° \quad (20)$$

The lines w14, w24, w34 are expressed by the following equation (21).

$$θc=(-12.5 \times Dh+15.25)° \quad (21)$$

Considering all the equations (18) to (21), the size of the basic order (e.g., 18th order for 6 poles 18 slots) component in the torque ripple of the output torque can be made to less than or equal to the order (e.g., 36th order for 6 poles 18 slots) component twice the basic order component by setting the angular width A in a range expressed by equation (1-2-0) and setting the angular width θc in a range expressed by equation (2-2-0).

Condition (1-2-0):

For the range of Dh≦0.5 mm, $$(-2.5 \times Dh+27.25)° \leq A \leq (-2.5 \times Dh+30.25)°$$

Condition (2-2-0):

$$(-12.5 \times Dh+15.25)° \leq θc \leq (-12.5 \times Dh+18.25)°$$

and $$θc < (60-A)°/2$$

Equations (1-2-0), (2-2-0) correspond to when R=25.5 mm and the number of poles is p=6, but equations (1-2-0), (2-2-0) can be extended to equations (1-2), (2-2), (ex1), (ex2) by having Dhr=Dh×25.5/R even when the radius R is not 25.5 mm or when the number of poles p is not 6.

Condition (1-2):

For the range of Dhr≦0.5 mm, $$(-2.5 \times Dhr+27.25)° \leq Ao \leq (-2.5 \times Dhr+30.25)°$$

Condition (2-2):

$$(-12.5 \times Dhr+15.25)° \leq θco \leq (-12.5 \times Dhr+18.25)°$$

and $$θco < (60-Ao)°/2$$

Equations (ex1), (ex2) are conversion equations for setting the angular width A and the angular width θc with respect to the range of the angular width Ao and θco set in equations (1-2) and (2-2) when p≠6. That is, for cases other than p=6, Ao and θco in equations (1-2), (2-2) are substituted by A×6/p and θc×6/p of equations (ex1) (ex2). That is, conversion of equations (ex1), (ex2) is performed and A, θc are used as the set angular width.

Figures 30A, 30B, 30C:
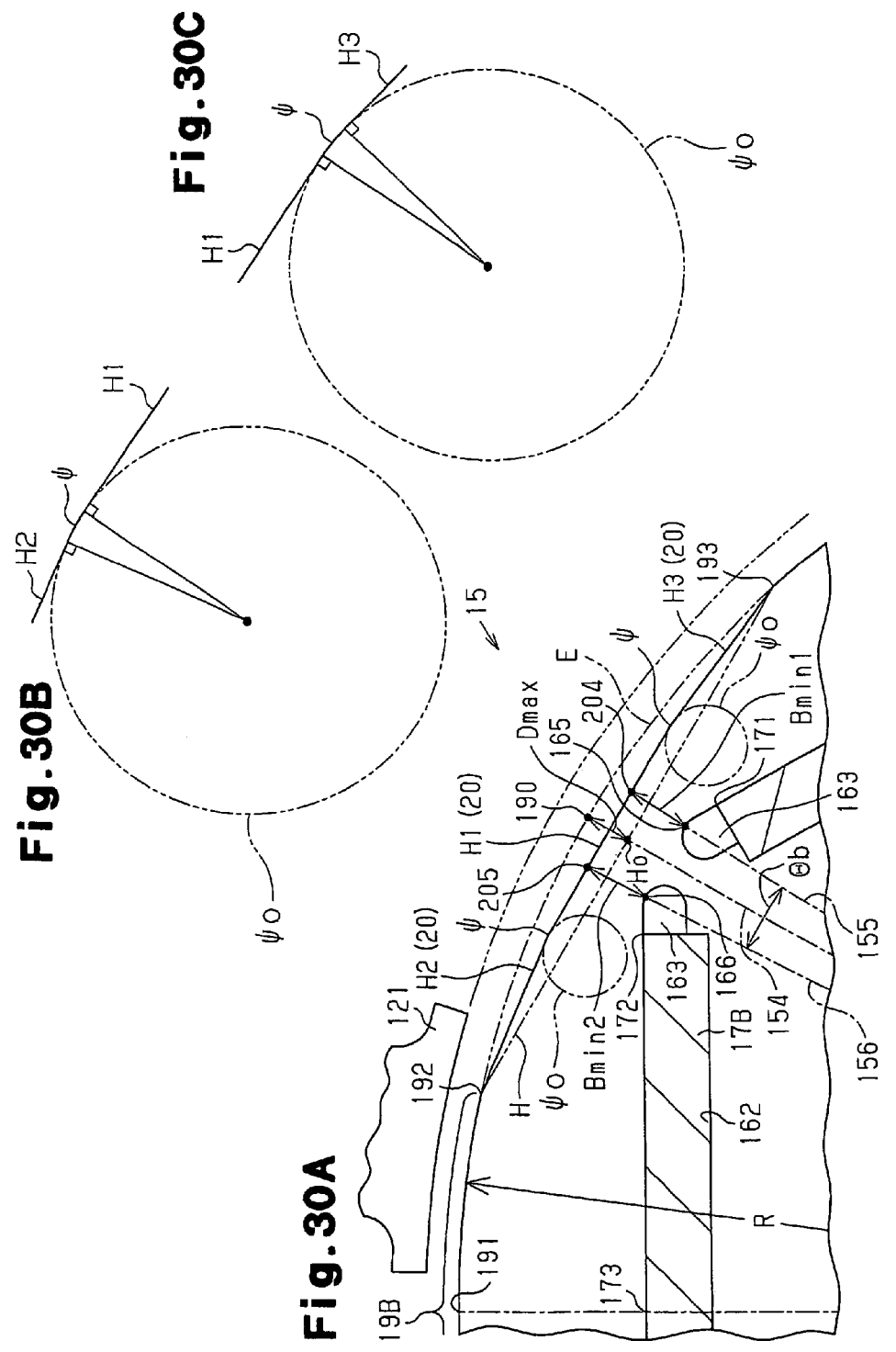

A second embodiment of the present invention will now be described with reference to FIGS. 30A to 30C. The same reference characters are denoted for components that are the same as those in the first embodiment.

In the second embodiment, the line H1 and the line H2, which are adjacent to each other, are connected by a convex curve ψ that is convex towards the outer side in the radial direction of the rotor 15, and the line H1 and the line H3, which are adjacent to each other, are connected by a convex curve ψ that is convex towards the outer side in the radial direction of the rotor 15. In the present embodiment, the convex curve ψ is part of a circle ψo having a radius of less than or equal to the virtual maximum difference Dmax.

The structure for connecting the two adjacent lines H1, H2 with the convex curve ψ and connecting the two adjacent lines H1, H3 with the convex curve ψ smoothes the magnetic flux fluctuation at the outer circumferential surface of the rotor 15. This suppresses the torque ripple.

It should be apparent to those skilled in the art that the present invention may be embodied in many other specific forms without departing from the spirit or scope of the invention. Particularly, it should be understood that the present invention may be embodied in the following forms.

(1) The shape of the convex portion 20 may be a convex polygonal shape formed by connecting four or more planes.

(2) The total number of permanent magnets 17A, 17B may be in pluralities other than six.

(3) The present invention may be applied to rotating electric machines with four poles and twelve slots, six poles and twenty-seven slots, eight poles and twenty-four slots, and so on. This would have the same advantages as the above embodiments.

(4) The winding method at the stator 11 may be distributed winding. This would obtain the same advantages as the above embodiments.

(5) The present invention may be applied to rotating electric machines having concentrated windings such as that with six poles and nine slots. This would obtain the same advantages as the above embodiments.

(6) The present invention may be applied to a rotating electric machine including a rotor 15 having two permanent magnets 17A, 17B in a V-shaped manner and having the two permanent magnets 17A, 17B embedded therein so that the polarity of the adjacent permanent magnets 17A, 17B is N-N-S-S-N-N-S-S- . . . .

Figure 31:
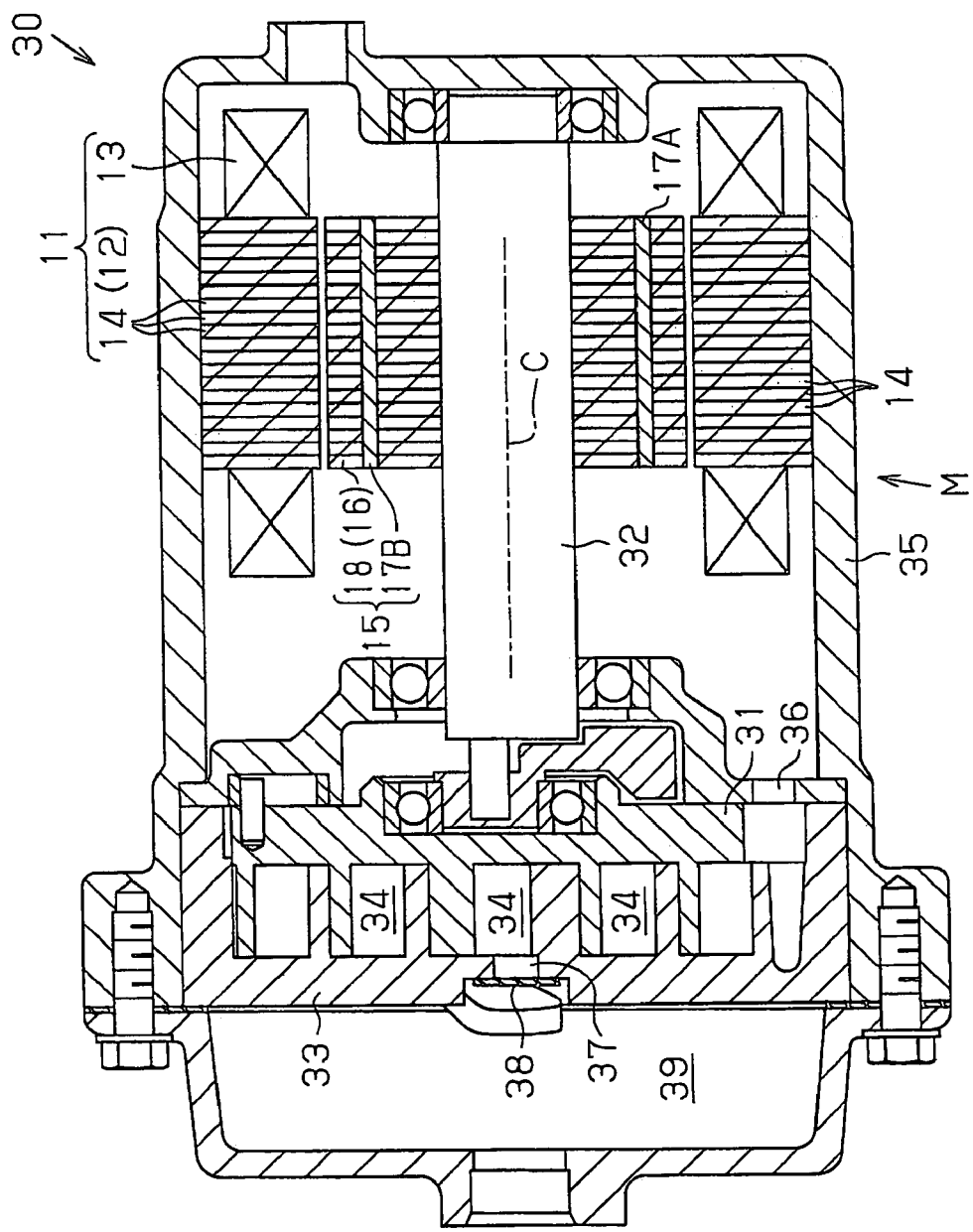
FIG. 31 is side cross-sectional view of an entire compressor to which the present invention is applied.

(7) As shown in FIG. 31, the present invention may be applied to an enclosed electric compressor 30. The electric compressor 30 is a scroll type electric compressor. The rotating electric machine M is used as a motor for car air conditioner. The rotor 15 of the rotating electric machine M is attached to the rotating shaft 32, and the stator 11 of the rotating electric machine M is fixed to the inner surface of the motor housing 35. The rotating shaft 32 of the rotating electric machine M rotates a movable scroll 31 of the electric compressor 30 (compression operation). This rotation reduces the volume of a compression chamber 34, which is defined between a fixed scroll 33 and the movable scroll 31 that serves as a compression operation body. Coolant is drawn into the motor housing 35 from an external coolant circuit (not shown) and sent through a suction port 36 into the compression chamber 34. The coolant in the compression chamber 34 is then forced out of a discharge valve 38 from a discharge port 37 and discharged into a discharge chamber 39. The coolant in the discharge chamber 39 then flows out into the external coolant circuit to flow back into the motor housing 35. An enclosed compressor refers to the rotating electric machine M being enclosed in a container integrally welded with the compressor 30.

The rotating electric machine M of the present invention is superior in that it has low pulsation (low vibration) and is suitable for application to the enclosed electric compressor 30. The demand for reducing noise and vibration without lowering the average value of the output torque is strong for vehicle enclosed electric compressors. The permanent magnet embedment rotating electric machine M satisfies such demands.

The present examples and embodiments are to be considered as illustrative and not restrictive, and the invention is not to be limited to the details given herein, but may be modified within the scope and equivalence of the appended claims.

What is claimed is:

1. A rotating electric machine comprising:
   an annular stator including an inner circumference, a plurality of teeth arranged along the inner circumference of the stator, and a slot defined between adjacent ones of the teeth;
   a coil arranged in the slot;
   a rotor surrounded by the stator, with the rotor having a rotational axis and an outer circumference extending about the rotational axis in a circumferential direction; and
   a plurality of permanent magnets embedded in the rotor, with each permanent magnet having a magnetic pole center;
   a plurality of circumferential portions respectively corresponding to the magnetic pole centers and defined along the outer circumference of the rotor at a plurality of locations, with each circumferential portion extending along part of a virtual circumferential surface, which is coaxial with the rotor, and spaced from one another in the circumferential direction; and
   a plurality of convex portions connecting adjacent pairs of the circumferential portions, wherein each of the convex portions is located radially inward from the virtual circumferential surface, projects in a radially outward direction, and includes a plurality of angled portions directed in the radially outward direction.

2. The rotating electric machine according to claim 1, wherein each of the convex portions is defined by connecting a plurality of straight lines lying along a cross-sectional plane orthogonal to the rotational axis of the rotor.

3. The rotating electric machine according to claim 2, wherein the angled portions of each convex portion is in a quantity of two, and the convex portion is defined by connecting three straight lines.

4. The rotating electric machine according to claim 3, wherein the two angled portions are minor images formed on opposite sides of a bisector bisecting the convex portion in the circumferential direction.

5. The rotating electric machine according to claim 4, wherein the three straight lines include a middle straight line and two side straight lines located on opposite sides of the middle straight line, with each of the two side straight lines being longer than an extension line that is drawn from the side straight line to the circumferential surface.

6. The rotating electric machine according to claim 3, wherein:
   the two straight lines located at the sides of the three straight lines are mirror images formed on opposite sides of a bisector bisecting the convex portion in the circumferential direction;
   when the angular width about the rotational axis of the circumferential portions is represented by A the number of poles of the rotating electric machine is represented by p, the angular width about the rotational axis between the two ends of each of the side straight lines is represented by $\theta c$, the radius of the circumferential portions is represented by R, the difference between the radius R and a minimum distance between the convex portion and the rotational axis is represented by depth Dh, in a state in which $Dhr = Dh \times 25.5/R$;
   the angular width A is set in a range satisfying following condition (1) and (ex1); and
   the angular width $\theta c$ is set in a range satisfying following condition (2), (ex1), and (ex2):

condition (1):

$$Ao \leq [60 - 2 \times \arccos(1 - Dh/25.5) - (-18.9 \times Dhr + 12.7)]°$$

and $$Ao < [60 - 2 \times \arccos(1 - Dh/25.5)]°$$

condition (2):
when the angular width A is in the range expressed by condition (1), one of the following equations (i) to (iii) is satisfied, and all of the equations (iv) to (vi) are satisfied:

$$\theta co \leq 10° \quad (i)$$

$$\theta co \leq (-0.5 \times Ao + 16)° \quad (ii)$$

$$\theta co \leq (2.5 \times Ao - 30)° \quad (iii)$$

$$[60 - Ao - 2 \times \arccos(1 - Dhr/25.5)]°/2 < \theta co \quad (iv)$$

$$[-0.5 \times Ao + (-14.1 \times Dhr + 26.7)]° \leq \theta co \quad (v)$$

$$\theta co < (60 - Ao)°/2 \quad (vi)$$

$$A = Ao \times 6/p \quad (ex1)$$

$$\theta c = \theta co \times 6/p \quad (ex2).$$

7. The rotating electric machine according to claim 6, wherein: the angular width A is set in a range satisfying following condition (1-1) and (ex1); and the angular width θc is set in a range satisfying following condition (2-1), (ex1), and (ex2):

condition (1-1):
for the range of Dhr≦1.2 mm, $$22° \leq Ao \leq (-10 \times Dhr + 37)° \text{ (when } Dhr \leq 0.5)$$

$$(-21.4 \times Dhr + 32.8)° \leq Ao \leq (-10 \times Dhr + 37)° \text{ (when } 0.5 < Dhr \leq 0.8)$$

$$(-38.75 \times Dhr + 46.5)° \leq Ao \leq (-27.5 \times Dhr + 51)° \text{ (when } 0.8 < Dhr)$$

condition (2-1):
when the angular width A is in the range expressed by condition (1-1), the condition (2) is satisfied and the following equation (vii) is satisfied:

$$\theta co \leq [(-2.5 \times Dhr + 2.5) \times (Ao - 16°) + 10]° \quad (vii)$$

$$A = Ao \times 6/p \quad (ex1)$$

$$\theta c = \theta co \times 6/p \quad (ex2).$$

8. The rotating electric machine according to claim 3, wherein:
the two straight lines located at the sides of the three straight lines are mirror images formed on opposite sides of a bisector bisecting the convex portion in the circumferential direction;
when the angular width about the rotational axis of the circumferential portions is represented by A, the number of poles of the rotating electric machine is represented by p, the angular width about the rotational axis between the two ends of each of the side straight lines is represented by θc, the radius of the circumferential portions is represented by R, the difference between the radius R and a minimum distance between the convex portion and the rotational axis is represented by depth Dh, in a state in which Dhr=Dh×25.5/R;
the angular width A is set in a range satisfying following condition (1-2) and (ex1); and
the angular width θc is set in a range satisfying following condition (2-2), (ex 1), and (ex2):

condition (1-2):
for the range of Dhr≦0.5 mm, $$(-2.5 \times Dhr + 27.25)° \leq Ao \leq (-2.5 \times Dhr + 30.25)°$$

Condition (2-2):

$$(-12.5 \times Dhr + 15.25)° \leq \theta co \leq (-12.5 \times Dhr + 18.25)°$$

and $$\theta co < (60 - Ao)°/2$$

$$A = Ao \times 6/p \quad (ex1)$$

$$\theta c = \theta co \times 6/p \quad (ex2).$$

9. The rotating electric machine according to claim 3, wherein the plurality of permanent magnets are respectively accommodated in a plurality of accommodating holes, an adjacent pair of the accommodating holes including a first accommodating hole and a second accommodating hole, wherein the first accommodating holes includes a first wall surface defining the first accommodating hole and having a first point, and wherein the second accommodating holes includes a second wall surface defining the second accommodating hole and having a second point, a maximum one of angular widths between the first point and the second point being referred to as an inter-bridge angle Θb, with the inter-bridge angle Θb being set in the range of 0<Θb≦10°,
the three straight lines include a first straight lines, a second straight line, and a third straight line, the second straight line and the third straight line being located on opposite sides of the first straight line,
wherein a point obtained when the first straight line undergoes parallel displacement and contacts the first wall surface is tentatively referred to as H01, and a point obtained when the third straight line undergoes parallel displacement and contacts the first wall surface is tentatively referred to as H30, wherein among the two points H01, H30, the one closer to the associated straight line H1, H3 is used as the first point,
wherein a point obtained when the first straight line undergoes parallel displacement and contacts the second wall surface is tentatively referred to as H02, and a point obtained when the second straight line undergoes parallel displacement and contacts the second wall surface is tentatively referred to as H20, wherein among the two points H02, H20, the one closer to the associated lines H1, H2 is used as the initial point.

10. The rotating electric machine according to claim 9, wherein the inter-bridge angle Θb is 5.2°.

11. The rotating electric machine according to claim 1, wherein each of the angled portions is a convex curve projecting in a radially outward direction of the rotor, connecting two of adjacent straight lines.

12. The rotating electric machine according to claim 1, wherein the plurality of permanent magnets have polarities differing alternately in the circumferential direction.

13. The rotating electric machine according to claim 1, wherein the plurality of circumferential portions are arranged at an equiangular pitch.

14. The rotating electric machine according to claim 1, wherein the teeth and the outer circumference of the rotor form a gap therebetween, the gap becoming largest at a portion corresponding to a polarity switching portion located between a pair of adjacent ones of the permanent magnets.

15. The rotating electric machine according to claim 1, wherein the coil is wave wound about the stator.

16. The rotating electric machine according to claim 1, further comprising: poles, the quantity of which is set to six.

17. The rotating electric machine according to claim 1, wherein there are a plurality of slots in which the quantity of the slots is eighteen.

18. The rotating electric machine according to claim 1, wherein the convex portions are formed so that output torque waveform of the rotating electric machine is increased to a higher order.

19. The rotating electric machine according to claim 18, wherein the convex portions are formed so that a basic order component of the output torque waveform of the rotating electric machine is increased to a higher order.

20. The rotating electric machine according to claim 1, wherein the permanent magnets are flat and orthogonal to a radial line of the rotor.

21. The rotating electric machine according to claim 1, wherein the permanent magnets are each spaced from the rotational axis of the rotor by the same distance.

22. The rotating electric machine according to claim 1, wherein the rotating electric machine is used as a car air conditioner motor.

23. A rotating electric machine according to claim 22, further comprising:

a rotation shaft rotated by the air conditioner motor; and a compression operation body for compressing gas in a compression chamber based on rotation of the rotation shaft.

* * * * *